US012448309B2

(12) United States Patent
Pelman et al.

(10) Patent No.: US 12,448,309 B2
(45) Date of Patent: Oct. 21, 2025

(54) OCEAN ALKALINITY RELEASE APPARATUS AND METHOD

(71) Applicant: Ebb Carbon, Inc., San Carlos, CA (US)

(72) Inventors: Todd Pelman, Moss Beach, CA (US); David Hegeman, San Jose, CA (US); Jeremy Loretz, Palo Alto, CA (US)

(73) Assignee: Ebb Carbon, Inc., San Carlos, CA (US)

( * ) Notice: Subject to any disclaimer, the term of this patent is extended or adjusted under 35 U.S.C. 154(b) by 0 days.

(21) Appl. No.: 19/031,604

(22) Filed: Jan. 18, 2025

(65) Prior Publication Data
US 2025/0270125 A1 Aug. 28, 2025

Related U.S. Application Data

(60) Provisional application No. 63/556,837, filed on Feb. 22, 2024.

(51) Int. Cl.
C02F 1/66 (2023.01)
B01D 53/78 (2006.01)
(Continued)

(52) U.S. Cl.
CPC ............ C02F 1/66 (2013.01); B01D 53/78 (2013.01); B01D 61/54 (2013.01);
(Continued)

(58) Field of Classification Search
None
See application file for complete search history.

(56) References Cited

U.S. PATENT DOCUMENTS

2016/0177344 A1* 6/2016 Subhas .............. B01D 53/62
435/297.1
2022/0260092 A1 8/2022 Bergrom
(Continued)

FOREIGN PATENT DOCUMENTS

WO 2023115224 A1 6/2023

OTHER PUBLICATIONS

Smith, Pete et al., Review Article entitled "Biophysical and economic limits to negative C02 emissions", published online Dec. 7, 2015, 9 pages.

(Continued)

Primary Examiner — Clare M Perrin
(74) Attorney, Agent, or Firm — Bever, Hoffman & Harms, LLP

(57) ABSTRACT

A release apparatus for receiving an ocean alkalinity product from an Ocean Alkalinity Enhancement (OAE) system (or other alkalinity source), and for releasing the alkalinity into an ocean at a maximum safe delivery rate to facilitate atmospheric $CO_2$ reduction and mitigate ocean acidification. The release apparatus includes a diffuser having a plenum chamber defining exit ports, a flow control mechanism that controls delivery of the ocean alkalinity product through the exit port(s) into an outfall region (i.e., an ocean region surrounding the diffuser), sensors for measuring seawater parameters in the outfall region, and a controller configured to control an operating (actuation) state of the flow control device (e.g., by way of generating and transmitting a flow control signal) in accordance with the measured seawater parameters. The plenum chamber is anchored at an outfall location and is maintained at a constant depth with the exit ports aimed toward the ocean surface.

19 Claims, 6 Drawing Sheets

(51) Int. Cl.
  *B01D 61/54* (2006.01)
  *C02F 1/461* (2023.01)
  *C02F 1/00* (2023.01)
  *C02F 103/08* (2006.01)

(52) U.S. Cl.
  CPC .......... *C02F 1/46104* (2013.01); *C02F 1/008* (2013.01); *C02F 2103/08* (2013.01); *C02F 2201/005* (2013.01); *C02F 2201/46145* (2013.01); *C02F 2209/006* (2013.01); *C02F 2209/06* (2013.01); *C02F 2209/40* (2013.01); *Y02C 20/40* (2020.08); *Y02P 10/122* (2015.11); *Y02P 20/151* (2015.11)

(56) References Cited

U.S. PATENT DOCUMENTS

| | | | |
|---|---|---|---|
| 2023/0106744 A1* | 4/2023 | Chalfin | G06Q 10/087 423/220 |
| 2023/0202869 A1* | 6/2023 | Pelman | B01D 61/002 210/652 |
| 2024/0044854 A1 | 2/2024 | Eisaman et al. | |
| 2024/0076214 A1* | 3/2024 | Johnson | C02F 1/68 |
| 2024/0336503 A1 | 10/2024 | Loretz et al. | |

OTHER PUBLICATIONS

Hartmann, Jens et al., article entitled "Stability of alkalinity in ocean alkalinity enhancement (OAE) approaches —consequenes for durability of CO2 storage", Biogeosciences, vol. 20, No. 4, pp. 781-802, published 2023 (specific date unknown).

Loretz, Jeremy, et al., pending U.S. Appl. No. 18/910,483, filed Oct. 9, 2024 entitled "Integrated Divalent Ion Precipitation and Bipolar Electrodialysis Reactor", Assignee: Ebb Carbon, Inc. (citing pending application since publication projected to not be until Jul. 10, 2025); 83 pages including 9 sheets of drawings.

* cited by examiner

OCEAN ALKALINITY RELEASE APPARATUS AND METHOD

RELATED APPLICATIONS/PATENTS

This application claims priority from U.S. Provisional Patent Application No. 63/556,837, entitled "Ocean Alkalinity Release APPARATUS AND METHOD", which was filed on Feb. 22, 2024.

FIELD OF THE INVENTION

The invention generally relates to systems that supply an alkaline material (base substance) to an ocean to both reduce atmospheric carbon dioxide ($CO_2$) and mitigate ocean acidification, and more particularly to systems and methods for safely and reliably releasing the alkaline substance into an ocean.

BACKGROUND

As humans burn more and more fossil fuels, the resulting increased carbon dioxide ($CO_2$) concentration in Earth's atmosphere causes both climate change and ocean acidification. The increased atmospheric concentrations of $CO_2$ and other greenhouse gasses (e.g., methane) produces climate change by trapping heat close to earth's surface, thereby increasing both air and sea temperatures. Because earth's oceans absorb about 25% of atmospheric $CO_2$, and because the absorbed $CO_2$ dissolves to form carbonic acid that remains trapped in the seawater, the increased atmospheric $CO_2$ concentration caused by burning fossil fuels also produces ocean acidification by way of increasing the amount of $CO_2$ gas dissolved in the ocean.

Both climate change and ocean acidification pose significant threats to humans. Climate change in the form of increased global average temperatures can produce several dangerous effects such as the loss of polar ice and corresponding increased sea levels, disease, wildfires and stronger storms and hurricanes. Ocean acidification changes the ocean chemistry that most marine organisms rely on. One concern with ocean acidification is that the decreased seawater pH can lead to the decreased survival of shellfish and other aquatic life having calcium carbonate shells, as well as some other physiological challenges for marine organisms.

To avoid dangerous climate change, the international Paris Agreement aims to limit the increase in global average temperature to no more than 1.5° C. to 2° C. above the temperatures of the pre-industrial era. Global average temperatures have already increased by between 0.8° C. and 1.2° C. The Intergovernmental Panel on Climate Change (IPCC) estimates that a 'carbon budget' of about 500 $GtCO_2$ (billion tons of carbon dioxide), which corresponds to about ten years at current emission rates, provides a 66% chance of limiting climate change to 1.5° C.

In addition to cutting $CO_2$ emissions by curtailing the use of fossil fuels, climate models predict that a significant deployment of Negative Emissions Technologies (NETs) will be needed to avoid catastrophic ocean acidification and global warming beyond 1.5° C. (see "Biophysical and economic limits to negative $CO_2$ emissions", Smith P. et al., Nat. Clim. Chang. 2016; 6:42-50). Current atmospheric $CO_2$ and other greenhouse gas concentrations are already at dangerous levels, so even a drastic reduction in greenhouse gas emissions would merely curtail further increases, not reduce atmospheric greenhouse gas concentrations to safe levels. Moreover, the reduction or elimination of certain greenhouse gas sources (e.g., emissions from long distance airliners) would be extremely disruptive and/or expensive and are therefore unlikely to occur soon.

Therefore, there is a need to supplement emission reductions with the deployment of NETs, which are systems/processes that serve to reduce existing atmospheric greenhouse gas concentrations by, for example, capturing/removing $CO_2$ from the air and sequestering it for at least 1,000 years. The need for NETs may be explained using a bathtub analogy in which atmospheric $CO_2$ is represented by water contained in a bathtub, ongoing $CO_2$ emissions are represented by water flowing into the tub, and NETs are represented by processes that control water outflow through the tub's drain. In this analogy, reduced $CO_2$ emission rates are represented by partially turning off the water inflow tap—the slower inflow rate provides more time before the tub fills, but the tub's water level will continue to rise and eventually overflow. Using this analogy, although reducing $CO_2$ emissions may slow the increase of greenhouse gas in the atmosphere, critical concentration levels will eventually be reached unless NETs are implemented that can offset the reduced $CO_2$ emission level (i.e., remove atmospheric $CO_2$ at the same rate it is being emitted). Moreover, because greenhouse gas concentrations are already at dangerous levels (i.e., the tub is already dangerously full), there is an urgent need for NETs that are capable of significantly reducing atmospheric $CO_2$ faster than it is being emitted to achieve safe atmospheric concentration levels (i.e., outflow from the tub's drain must be greater than the reduced inflow from the tap to reduce the tub's water to a safe level).

NETs can be broadly characterized as Direct Air Capture (DAC) approaches and Ocean Capture approaches. DAC approaches utilize natural (e.g., reforestation) and technology-based methods to extract $CO_2$ directly from the atmosphere. Ocean capture approaches utilize various natural and/or technological processes to remove $CO_2$ from the atmosphere and store it in the ocean as bicarbonate, a form of carbon storage that is stable for over 10,000 years.

Electrochemical ocean alkalinity enhancement (OAE) represents an especially promising ocean capture approach that both reduces atmospheric $CO_2$ and mitigates ocean acidification by generating an ocean alkalinity product (i.e., an aqueous alkaline solution containing a fully dissolved base substance) and supplying the ocean alkalinity product to ocean seawater at a designated outfall location (release point). OAE systems typically generate the required base substance using a bipolar electrodialysis device (BPED), which generally includes an ion exchange (IE) stack that performs an electrochemical salt-conversion process to convert salt supplied in an aqueous salt feedstock solution into the base substance and an acid substance. The base substance produced by the BPED is then incorporated into the ocean alkalinity product that is then supplied to the ocean at the outfall location. As the base substance diffuses (disperses) into the seawater surrounding the outfall location it serves to directly reverse ocean acidification (i.e., by utilizing the base substance in the ocean alkalinity product to increases the ocean seawater's alkalinity), and indirectly reduces atmospheric $CO_2$ (i.e., increasing the ocean seawater's alkalinity increases the ocean's ability to absorb/capture atmospheric $CO_2$). Moreover, because the generated base substance is fully dissolved in the ocean alkalinity product, the electrochemical OAE approach avoids problems associated with other OAE approaches (e.g., dissolution kinetics issues that are associated with conventional mineral OAE approaches).

An unresolved problem faced by electrochemical OAE (and other OAE-type) systems involves controlling the delivery (release) rate of ocean alkalinity product into an ocean outfall region (i.e., a volume of seawater surrounding an outfall location) in a way that avoids stagnation-related negative effects. Under ideal conditions, the kinetic parameters of seawater in a given outfall region (e.g., the bulk seawater movement through the outfall region) remain positive and constant, whereby ocean alkalinity product supplied at a constant delivery rate is reliably dispersed from the outfall location into the surrounding ocean seawater. In reality, the kinetic parameters in a given outfall region vary over time due to various tidal and seasonal water fluctuations, giving rise to periods in which, for example, the bulk seawater movement through the outfall region becomes relatively low or entirely stagnant. When the kinetic parameters at a release point decreases while the ocean alkalinity product is supplied at a constant delivery rate, the concentration of alkaline material within the outfall region necessarily increases. The phrase "stagnation-related negative effects" is used herein to refer problems associated with increases in alkaline material concentration in an outfall region that are produced when the kinetic parameters are too low for current ocean alkalinity product delivery rate. Two major stagnation-related negative effects associated with the delivery of ocean alkalinity product include precipitation and unsafe/toxic pH levels. Precipitation of calcite and brucite, among other minerals, can occur when the delivery (release) rate of an ocean alkalinity product is too high for current seawater parameters in the outfall region (e.g., when bulk water movement through the outfall region is too slow, which allows alkalinity concentrations to increase above critical levels at which precipitation can occur). Although some of the precipitated minerals (e.g., brucite) can redissolve, other minerals (e.g., calcite) do not readily redissolve and can release $CO_2$ gas molecules upon formation and catalyze a runaway precipitation event due to the supersaturated state of calcium in seawater. Moreover, any particulate, such as brucite or other suspended solids, can form nucleation sites for more precipitation. Even if the alkaline material concentration and/or seawater compositions do not produce precipitation in response to decreasing kinetic parameters, the alkaline material concentration may become high enough to cause unsafe/toxic ph levels (i.e., elevated PH levels and changes to seawater composition that can be toxic or detrimental to organisms in ecosystems in the immediate vicinity of the outfall location). Note that, even under entirely stagnant kinetic conditions, alkaline material disperses away from an outfall region by way of diffusion, so stagnation-related negative effects may be avoided or corrected by way of decreasing (reducing or entirely stopping) the alkaline material delivery rate.

Another problem faced by electrochemical OAE (and other OAE-type) systems involves delivering the ocean alkalinity product to the ocean such that the plume of alkaline material molecules remains close to the ocean's surface (i.e., <50 m). That is, an atmospheric $CO_2$ molecule is absorbed/captured by the ocean when the $CO_2$ molecule interacts with an alkaline material molecule disposed in the ocean, and this interaction can only occur when the alkaline material molecule is close to the ocean's surface. Therefore, an OAE system's net carbon dioxide removal (CDR) rating may be significantly affected by the system's ability to deliver ocean alkalinity product in a way that maximizes interactions between the alkaline material and air and minimizes sunken/wasted alkaline material.

Sunken/wasted alkaline material occurs when the released alkaline material moves significantly below the ocean surface, thereby preventing the alkaline material from interacting with air and capturing atmospheric $CO_2$ gas, thereby limiting OAE system's net CDR rating.

What is needed is an apparatus/method that is capable of reliably delivering (releasing) an alkaline substance (e.g., the base substance contained in an ocean alkalinity product generated by an electrochemical OAE system) in a manner that addresses at least some of the above-mentioned problems. In particular, what is needed is a release apparatus capable of controlling the release of ocean alkalinity product in accordance with changes to the ocean seawater chemistry and kinetics such that (i) the alkalinity delivery (release) rate is maximized and (ii) the alkalinity properly mixes with the seawater located at an outfall location (e.g., the alkalinity delivery rate is maintained below a rate that could cause stagnation-related negative effects).

SUMMARY

In an embodiment the present invention is directed to an OAE system including a land-based electrochemical reactor (e.g., a bipolar electrodialysis device (BPED)), an ocean-based release apparatus and a controller. The electrochemical reactor utilizes known techniques to convert salt (e.g., NaCl) supplied by a salt feedstock (e.g., seawater drawn from a nearby ocean) into an acid substance (HCl) and a base substance (NaOH), and is configured to utilize the base substance (alkalinity) to generate a high pH ocean alkalinity product and to supply the ocean alkalinity product to the ocean-based release apparatus (e.g., by way of a pump and transfer-out pipe). The ocean-based release apparatus includes a diffuser, at least one flow control mechanism (e.g., a release valve) and at least one sensor. The diffuser is disposed at a designated offshore outfall location in the ocean and includes a plenum chamber defining one or more exit ports (e.g., holes or nozzles). In some embodiments the plenum chamber may be maintained at a depth (e.g., a meter or two) below the ocean surface by suspending the plenum chamber below a floating structure (e.g., using a tether) with the exit ports aimed toward the ocean surface, whereby the ocean alkalinity product expelled through the exit ports is directed toward the ocean surface, thereby enhancing CDR and reducing sunken/wasted alkaline material. The diffuser may be maintained at the outfall location (i.e., within a predetermined outfall region) by a securing structure connected between the plenum chamber and a fixed object (e.g., a pier, trestle, or parked vessel (e.g., an anchored, moored, berthed or docked barge). The flow control mechanism is configured to control a delivery (volumetric flow) rate of the ocean alkalinity product from the electrochemical reactor through the exit port(s) such that the base substance (alkalinity) contained in the delivered ocean alkalinity product is forced into an outfall region (i.e., a volume of seawater surrounding the diffuser), whereby the base substance is dispersed (e.g., by way of ocean currents and/or diffusion) into the surrounding ocean seawater. The flow control mechanism is remotely controllable (e.g., a release valve that opens/closes in accordance with a received electronic valve control signal). The sensor is disposed in the ocean adjacent to the diffuser (e.g., attached to the diffuser by a second securing structure) and is configured (using known techniques) to measure one or more seawater parameters (e.g., one or more of ionic composition [hardness], turbidity, pH, alkalinity, DIC, temperature, salinity, current speed and/or direction) of the portion/volume of seawater located in the outfall region, and is configured to generate and transmit (e.g., using wired or wireless transmission) a sensor signal including data corresponding to the measured seawater parameter(s) (i.e., the sensor signal data is generated such that it varies in accordance with changes in the measured seawater parameters). The controller is configured to control an operating (actuation) state of the flow control device (e.g., by way of generating and transmitting a flow control signal) in accordance with the measured seawater parameter data provided in the sensor signals such that the base substance (alkalinity) passes through the exit ports into the outfall region at a maximum safe delivery rate (i.e., a flow rate that maximizes the amount of alkaline material supplied into the outfall region while minimizing precipitation and unsafe/toxic pH levels in the outfall region). In some embodiments the controller is implemented using one or more processors configured to implement a control algorithm that utilizes one of a proportional integral derivative, machine learning and/or artificial intelligence to determine whether the seawater parameter data provided in the sensor signal exceeds one or more predetermined threshold values (e.g., maximum allowable pH value), and to generate a control signal that controls/causes the flow control mechanism to reduce (diminish or entirely stop) the flow of the ocean alkalinity product when the seawater parameter data indicates that a predetermined threshold value has been exceeded. By monitoring seawater parameters in the outfall region and controlling the alkalinity outfall location and delivery rate to the ocean in this manner, the OAE system increases the ocean's ability to capture and store atmospheric $CO_2$ and to reverse ocean acidification while avoiding the negative effects of improper alkaline delivery (see Background, above).

In some embodiments the plenum chamber of the diffuser includes at least one elongated structure (e.g., a section of PVC or other pipe) having a peripheral wall that surrounds an interior cavity. An entry port is located at one end of the plenum chamber and is operably coupled to receive ocean alkalinity product passed through the flow control mechanism by way of a feedline such that the ocean alkalinity product enters into the interior cavity. Each exit port includes an opening/hole extending through the peripheral wall such that pressurized ocean alkalinity product disposed in the interior cavity passes through each of the exit ports and into the outfall region. In some embodiments each exit port includes a nozzles that is operably coupled to the peripheral wall over an associated opening/hole and configured to tune each outflow (i.e., the ocean alkalinity product passing from the interior cavity through the associated opening/hole) to a predetermined optimal release flow rate, and such that each alkalinity plume is directed in a desired direction/trajectory (e.g., upward toward the ocean surface) and with a velocity that enhances CDR by maximizing the amount of alkaline material at or just below the ocean surface. In some embodiments the plenum chamber is configured such that a cross-sectional dimension of the interior cavity is tapered (e.g., changes from wide to narrow in relation to a distance from the entry port) to generate a uniform delivery flow rate of the ocean alkalinity product through the exit ports.

In alternative embodiments the diffuser is configured such that the exit ports are arranged in a line (1D), an array (2D) or matrix (3D) configuration to facilitate the efficient distribution of alkalinity into large volumes of seawater. In an exemplary 1D embodiment, the plenum chamber of the diffuser comprises a single elongated structure (e.g., an elongated pipe or straight tubing) including a peripheral wall surrounding an interior cavity with the exit ports (openings/holes) formed through the peripheral wall and arranged in a linear spaced-apart (1D) configuration (e.g., such that, when the plenum chamber is submerged and oriented parallel to the ocean surface, alkalinity is expelled from the interior cavity through each of the exit ports in the same (e.g., vertical) general direction). In exemplary 2D embodiments, the diffuser includes a plenum chamber having two or more elongated structures that extend in parallel from a branching structure to deliver alkalinity from exit ports disposed in a 2D configuration that provides adequate spacing between adjacent exit ports to allow for adequate mixing of the alkalinity with the receiving seawater. In some embodiments floating structures are utilized to maintain the exit ports in either a horizontal plane, a vertical plane, or some angle in between, relative to the ocean's surface, thereby improving alkaline distribution in larger volumes of sea water (i.e., in comparison to 1D arrangements). In an exemplary 3D embodiment, the diffuser includes a plenum chamber having multiple parallel elongated structures arranged in rows and columns and coupled to a feedpipe by way of a multi-part branching structure, thereby further improving alkaline distribution in larger volumes of sea water.

In some embodiments the release apparatus is maintained within a designated outfall region by way of floating structures and securing structures (anchor points). In some embodiments the plenum chamber is suspended from two or more floating structures (e.g., by tethers) such that the exit ports are maintained at a predetermined depth (e.g., a meter or two) below the ocean surface at all times (i.e., at both low tide and high tide. In some embodiments the plenum chamber is connected to two or more anchor points (e.g., by securing structures) such that the plenum chamber is movably maintained within the designated outfall region (e.g., such that the diffuser is able to move with seasonal water fluctuations). In some embodiments each sensor is configured to measure seawater parameters (e.g., turbidity or tidal flow) associated with local mixing conditions adjacent to an associated exit port. In some embodiments at least one sensor is configured to measure speed and direction of an ocean current passing through the outfall region.

In some embodiments, the plenum chamber includes multiple elongated members (e.g., plastic pipes) that are operably coupled to an entry port by way of a branching structure, and the diffuser further comprises (secondary) flow control mechanisms respectively operably coupled to supply the ocean alkalinity product from the branching structure to an associated elongated member. This arrangement facilitates the efficient delivery of alkalinity by way of multiple exit ports disposed in a large array or matrix (i.e., by terminating alkalinity delivery in problematic sub-regions while allowing the continued alkalinity delivery in non-problematic sub-regions).

In some embodiments, the composition of the alkaline plumes is controlled by process streams to decrease the required dilution while maintaining the fluid flow/pressure through the plenum chamber. In an exemplary embodiment a mixing valve (third flow control mechanism) is operably coupled at its upstream end (e.g., by way of a transfer pipe/hose) to receive a mixing fluid (e.g., high sea mineral water streams, or a reject stream from nanofiltration or other water treatment systems), and is operably coupled at its downstream end (by way of second feedpipe to supply the mixing fluid to the upstream end of the entry port. A mixing mechanism (e.g., apipe) is disposed between the upstream end of the entry port and both the flow control mechanism/release valve and the mixing valve such that mixing fluid passed through the mixing valve mixes with ocean alkalinity product passed through the flow control mechanism before the mixture passes through the entry port into the plenum chamber. In this embodiment the controller is further configured to control both the flow control mechanism and the mixing valve in response to sensor data such that the alkalinity (base substance) flow rate delivered through the exit ports into the ocean's seawater located at the outfall location is determined by the corresponding amounts of ocean alkalinity product and mixing fluid respectively passed through the flow control mechanism and the mixing valve. This arrangement facilitates adjusting the amount of delivered alkalinity while maintaining a desired fluid pressure inside the plenum chamber.

The present invention is primarily described herein with specific reference to release apparatuses configured to control the delivery of an ocean alkalinity product generated by an electrochemical reactor (e.g., a bipolar electrodialysis device of an OAE system). However, at least some of the release apparatus embodiments described herein may represent stand-alone inventions, for example, when modified to include a storage-type onshore or floating alkalinity source (i.e., a receptacle capable of receiving/storing, but not producing, ocean alkalinity product) that is operably coupled to the diffuser by way of at least one conduit (e.g., transfer-out pipe and/or feedline 222, shown in FIG. 1) that is configured to direct (channel) a flow of ocean alkalinity product from the alkalinity source into the diffuser's plenum chamber. Alternatively, at least some of the release apparatus embodiments described herein may be utilized to release alkalinity in other OAE systems (i.e., other than electrochemical OAE systems) or Negative Emissions Technology system types that generate ocean alkalinity products similar to that described herein. In these embodiments, the ocean alkalinity product generation apparatus may form the alkalinity source that is coupled to the diffuser by way of an intervening conduit. The benefits of utilizing the release apparatuses described herein are similar to those mentioned with reference to the various exemplary embodiments.

In another embodiment a method for delivering ocean alkalinity product includes systematically (e.g., periodically or continuously) measuring seawater parameter(s), systematically determining and updating a maximum safe delivery rate to reflect changes in the measured seawater parameter(s), and systematically modifying (adjusting) a current (real-time) delivery rate of ocean alkalinity product is delivered into the outfall region at the most-recently determined maximum safe delivery rate. Each of the systematically measured seawater parameters is utilized to generate an associated data value in a form (e.g., electronic digital data) that is suitable for calculating a corresponding updated maximum safe delivery rate. Measuring seawater parameter(s) and calculating updated maximum safe delivery rates may be performed using the sensors and controllers described herein or may be performed using other suitable devices (e.g., an integral sensor/processor unit capable of performing the sensor and controller functions Modifying the current delivery rate to equal described herein). the most-recently generated maximum safe delivery rate involves, for example, decreasing (or increasing) the rate at which ocean alkalinity product is delivered into the ocean when the most-recently generated maximum safe delivery rate is lower (or higher) than the immediately preceding systematically generated maximum safe delivery rate. Modifying and controlling the rate at which ocean alkalinity product is delivered into the ocean may be performed using the diffusers and flow control mechanisms described herein or may be performed using other suitable devices (e.g., dosing pumps). The benefits of this method are described herein with reference to the various exemplary embodiments.

DETAILED DESCRIPTION

The embodiments described herein primarily relate to release apparatuses and methods for safely and efficiently delivering alkalinity to oceans. The release apparatuses are primarily described herein with specific reference to the delivery of alkalinity provided in an ocean alkalinity product generated by an electrochemical reactor (e.g., a bipolar electrodialysis device) of an OAE system, but may be utilized as stand-alone ocean alkalinity delivery systems. The following description is presented to enable one of ordinary skill in the art to make and use the methods and systems described herein as provided in the context of specific embodiments. Various modifications to the embodiments will be apparent to those with skill in the art, and the general principles defined herein may be applied to other embodiments. Therefore, the methods and systems described herein are not intended to be limited to the particular embodiments shown and described but are to be accorded the widest scope consistent with the principles and novel features herein disclosed.

Figure 1:
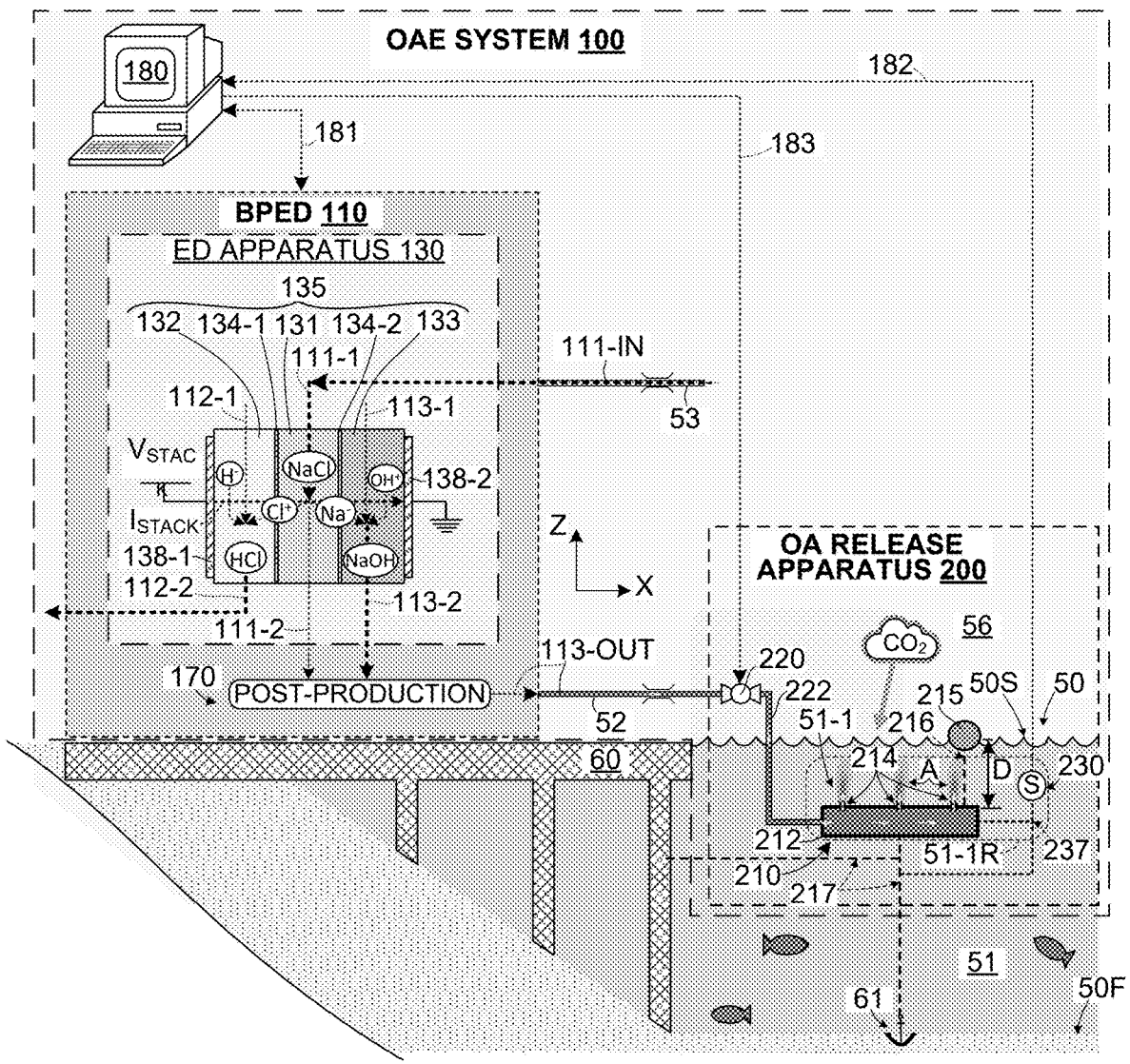
FIG. 1 is a diagram depicting a simplified OAE system including a release apparatus according to an embodiment of the present invention.

FIG. 1 shows an exemplary simplified OAE system 100 that generally includes a land-based BPED (electrochemical reactor) 110, an ocean-based release apparatus 200 and a controller 180. As set forth below, BPED 110 serves to generate an ocean alkalinity product 113-OUT including a base substance (aka alkalinity, e.g., NaOH) that is fully dissolved in an aqueous solution (e.g., saltwater having a higher pH than that of seawater). As also set forth below, release apparatus 200 and controller 180 function to supply the ocean alkalinity product 113-OUT into an ocean 50 at a maximum safe delivery rate (i.e., a flow rate that maximizes the amount of alkalinity delivered to ocean 50 while avoiding stagnation-related negative effects).

BPED 110 generally includes an electrodialysis (ED) apparatus 130, one or more post-production devices 170 and flow control resources (not shown in FIG. 1). As set forth below, ED apparatus 130 functions to electrochemically process (convert) salt provided in feedstock solution 111-IN (e.g., seawater 51 pumped or otherwise supplied from ocean 50 by way of a transfer-in pipe 53) into an acid substance and a base substance, and post-production devices 170 mainly function to generate ocean alkalinity product 113-OUT using the base substance generated by ED apparatus 130.

ED apparatus 130 generally includes an ion exchange (IE) stack 135 that is disposed between two electrodes (i.e., anode 138-1 and cathode 138-2). IE stack 135 typically includes multiple cells arranged in series between electrodes 138-1 and 138-2, where each cell includes three chambers that respectively serve as parallel flow channels for the aqueous salt, acid and base solutions as they pass through IE stack 135. For brevity and clarity, only one cell of IE 135 is depicted in FIG. 1, which is made up of a salt chamber 131 that functions to channel a portion of the salt feedstock solution, an acid chamber 132 that channels a portion of the aqueous acid solution, and a base chamber 133 that channels a portion of the base solution. Each cell's salt chamber 131 is disposed between and separated from the cell's acid chamber 132 and base chamber 133 by corresponding ion exchange membranes 134-1 and 134-2, which are configured to facilitate the transfer of sodium and chloride ions from the salt chamber into the base and acid chambers during the electrochemical process as described below. Electrodialysis apparatus 130 also includes manifold or other structures (not shown) that are configured to cooperate with the flow control resources of BPED 110 to direct the three different (i.e., a salt feedstock, acid and base) aqueous solutions through corresponding salt/acid/base chambers of IE stack 135. Specifically, the aqueous salt feedstock solution enters IE stack 135 as a strong salt stream 111-1 that is divided and directed (e.g., by an input manifold, not shown) into the inlet of each cell's salt flow channel 131, and the aqueous salt feedstock solution exits the IE stack 135 by way of an outlet of each cell's salt flow channel 131 (and an outlet manifold, not shown) as a weak (depleted) salt stream 111-2. Similarly, the aqueous acid solution enters IE stack 135 as a weak acid stream 112-1 that is directed into the inlet of each cell's acid flow channel 132 and exits the IE stack 135 by way of an outlet of each cell's acid flow channel 132 as a strong acid stream 112-2. Finally, the aqueous base solution enters IE stack 135 as a weak base stream 113-1 that is directed into the inlet of each cell's base flow channel 133 and exits the IE stack 135 by way of an outlet of each cell's base flow channel 133 as a strong base stream 113-2.

ED apparatus 130 performs the electrochemical process when the three aqueous solutions are directed through IE stack 135 along parallel flow paths (e.g., parallel to the Z-axis direction) while a stack voltage VSTACK is applied to electrodes 138-1 and 138-2. When stack voltage VSTACK is sufficiently strong, the resulting electric field produces an ionic current ISTACK across IE stack 135 in a direction perpendicular to the parallel flow paths (e.g., in the X-axis direction), whereby anions in the aqueous salt/base/acid solution streams (e.g., chloride ions (Cl⁻) and hydroxide ions (OH⁻)) move toward anode 138-1 and cations in the aqueous solution streams (e.g., sodium ions (Na⁺) and protons (H⁺)) move toward the cathode 138-2. ionic current causes dissociated salt molecules (i.e., sodium ions (Na⁺) and chloride ions (Cl⁻)) to exit strong salt stream 111-1 in opposite directions (i.e., such that the chloride ions (Cl⁻) pass through ion exchange filter 138-1 from salt chamber 131 into the acid chamber 132, and the sodium ions (Na⁺) pass through ion exchange filter 138-2 into base chamber 133). The chloride ions (Cl⁻) then combine with protons (H⁺) to form "new" acid (HCl) molecules in the acid solution stream flowing through acid chamber 132, and the sodium ions (Na⁺) combine with hydroxide ions (OH⁻) to form "new" base (NaOH) molecules in the base solution stream flowing through base chamber 133. As a result of this electrochemical salt-conversion process, strong base stream 113-2 exits each cell's base chamber 133 with a significantly higher concentration of base substance than that of weak base stream 113-1 (i.e., as it enters IE stack 135). Similarly, strong acid stream 112-2 exiting each cell's acid chamber 132 has a higher concentration of acid substance than that of weak acid stream 112-1. Note that, because salt is converted (consumed) to generate the acid and base substances, weak/depleted salt solution stream 111-2 exiting each cell's salt chamber 131 has a lower salt content than strong salt stream 111-1 (i.e., as it enters IE stack 135).

As indicated below IE stack 135, post-production device 170 receives one or more of the solution streams leaving IE stack 135 and may be configured to process one or more of the base substance and acid substance produced by the electrochemical process performed in ED apparatus 130. In the depicted embodiment, post-production device 170 is configured to generate ocean alkalinity product 113-OUT using at least some of the base substance provided in strong base stream 113-2. In some embodiments post-production device 170 also includes a pump or other device (not shown) to supply ocean alkalinity product 113-OUT to release apparatus 200 (e.g., by way of transfer Additional information regarding the configuration and operation of BPED 110 is provided in co-owned and co-pending U.S. patent application Ser. No. 18/131,839, filed Apr. 6, 2023, entitled PRODUCTION EFFICIENCY OPTIMIZATION FOR BIPOLAR ELECTRODIALYSIS DEVICE, which is incorporated herein by reference in its entirety. Although described with reference to BPEDs including three-chamber ion exchange (IE) stack arrangement, the present invention may be utilized in conjunction with other BPEDs and electrochemical reactors that implement other IE stack arrangements (e.g., such as the two-chamber IE stack arrangement described in co-owned and co-pending U.S. patent application Ser. No. 18/910,483, filed Oct. 9, 2024, entitled INTEGRATED DIVALENT ION PRECIPITATION AND BIPOLAR ELECTRODIALYSIS REACTOR, which is incorporated herein by reference in its entirety.

Referring to the lower-right portion of OAE system 100 (FIG. 1), release apparatus 200 generally includes a diffuser 210, a release valve (flow control device) 220 and one or more sensors 230.

Diffuser 210 is disposed at a designated offshore (ocean-based) outfall location 51-1 in ocean 50 and generally includes a plenum chamber 212 defining one or more exit ports 214. In some embodiments plenum chamber 212 serves as a pressure vessel or reservoir capable of receiving ocean alkalinity product 113-OUT from BPED 110 (e.g., by way of transfer-out pipe 52, release valve 220 and a feedline 222) at a high enough pressure to force some of ocean alkalinity product 113-OUT out of plenum chamber 212 through exit ports 214. In some embodiments exit ports 214 may be holes (openings) that extend through a cylindrical wall surrounding plenum chamber 212, whereby alkalinity (base substance) contained in the portion of ocean alkalinity product 113-OUT forced out of plenum chamber 212 through exit ports 214 (e.g., as indicated by the vertical arrow and alkalinity plume A appearing above each exit port 214) is delivered into an outfall region 51-1R surrounding diffuser 210 and diffuses or otherwise disperses into the surrounding ocean seawater. As described below, in other embodiments the exit ports may utilize nozzles or other devices to control and direct the exiting ocean alkalinity product. In some embodiments diffuser 210 includes a floating structure 215 that is secured (e.g., by a tether 216) to plenum chamber 212 such that, when floating structure 215 is disposed on ocean surface 50S over the designated outfall region 51-1R, plenum chamber 212 is maintained at a predetermined depth D (e.g., a meter or two) below the ocean surface 50S with exit ports 214 aimed toward ocean surface 50S (i.e., such that alkalinity plumes A are directed parallel to the indicated Z-axis or at an acute angle relative to the Z-axis). This arrangement facilitates maintaining exit ports 214 (i.e., the release point of alkalinity) at an optimal distance below ocean surface 51S and oriented to maximize the amount of alkaline material located at or near ocean surface 50S at all points of the tidal cycle, thereby enhancing the CDR rating (i.e., the effective capture and drawdown of atmospheric $CO_2$) of OAE system 100 and reducing sunken/wasted alkaline. In some embodiments diffuser 210 is maintained at the outfall location 51-1 by at least one (first) securing structure 217 that is connected between plenum chamber 212 and a fixed object (e.g., a pier 60, a trestle, a parked vessel (e.g., an anchored, moored, berthed or docked barge), or to the ocean floor 50F by way of an anchor 61), whereby a distance separating plenum chamber 212 and the fixed object is limited by the length of securing structure 217. Similarly, sensors S are maintained adjacent to exit ports 214 (i.e., within outfall region 51-1R) by at least one (second) securing structure 237 that is preferably connected between each sensor S and plenum chamber 212 but may be connected between each sensor S and the fixed object to which the diffuser is secured (e.g., pier, trestle, anchor, vessel or barge). As explained in additional detail below, utilizing securing structures 217 to maintain diffuser 210 at a designated outfall location 51-1 facilitates the efficient release of alkalinity by automatically adjusting the outfall dynamic in accordance with changing ocean conditions (e.g., tidal cycles and seasonal water fluctuations) facilitates movement of diffuser 210 with seasonal water fluctuations, as well as aiding with the strategic placement of the outfall location such that the alkalinity delivery will be most effective.

Release valve (flow control mechanism) 220 serves to control a delivery rate of ocean alkalinity product 113-OUT from plenum chamber 212 through exit ports 214 and into outfall region 51-1R in accordance with a valve control signal 183, which is generated and received from controller 180 as described below. In the exemplary embodiment release valve 220 is an electrically operated valve (e.g., a metering valve or a control valve) that is operably coupled between transfer-out pipe 52 and feedline 222 and includes a mechanism (e.g., a ball valve and associated motor) that is actuated (adjusted between fully opened and fully closed operating/actuation states) in response to valve control signal 183. That is, an upstream end of release valve 220 is coupled to receive ocean alkalinity product 113-OUT supplied from BPED 110 by way of transfer-out pipe 52, and a downstream end of release valve 220 is coupled to diffuser 210 by way of feedline 222. In the exemplary embodiment BPED 110 is configured to supply ocean alkalinity product 113-OUT to release valve 220 with sufficient pressure such that, when release valve 220 is in an open operating state, ocean alkalinity product 113-OUT is delivered (by way of feedline 222) through the release valve 220 into plenum chamber 212, and a portion of ocean alkalinity product 113-OUT is forced out of plenum chamber 212 through exit port 214 in an upward direction (i.e., toward ocean surface 50S), thereby delivering alkalinity to ocean 50 in a manner that enhances CDR and minimizes sunken/wasted alkaline. As described below with reference to FIGS. 1A to 1C, release valve 220 is configured such that the flow rate of ocean alkalinity product 113-OUT through exit ports 214 is variable (increased or decreased) by way of corresponding adjustments to the operating/actuation state of release valve 220, and that these operating/actuation state adjustments are controlled by way of valve control signal 183. In other embodiments the function of release valve 220 may be implemented using one or more other electrically operated flow control devices (e.g., one or more pumps).

Sensor 230 is disposed in ocean 50 adjacent to the diffuser 210 (e.g., within or adjacent to outfall region 51-1R) and is configured to measure one or more seawater parameters (e.g., one or more of ionic composition [hardness], turbidity, pH, alkalinity, DIC, temperature, salinity, current speed and/or direction) of a portion of seawater 51 adjacent to exit ports 214, and to generate and transmit a sensor signal 182 including data corresponding to the measured seawater parameter(s). In some embodiments, sensor 230 is configured to encode measurement data corresponding to one or more seawater parameters and to generate sensor signal 182 such that it includes the encoded measurement data. As set forth below, sensor 230 functions to measure real-time seawater parameters that may be used to anticipate undesirable seawater conditions (e.g., stagnation-related negative effects) that may occur in outfall region 51-1 in response to a current alkalinity delivery rate, thereby facilitating corrective action (i.e., reducing the alkalinity delivery rate to a level that corrects or precludes the anticipated undesirable seawater conditions).

Controller 180 comprises one or more electronic devices (e.g., processors or ASICs) configured to receive sensor signal(s) 182 from sensor(s) 230 and to control an operating state of a flow control mechanism in accordance with the associated measured seawater parameters such that alkalinity (base substance) passes through exit ports 214 into the ocean's seawater located in outfall region 51-1R at a maximum safe delivery rate (i.e., a flow rate that maximizes the amount of alkalinity delivered into outfall region 51-1R while avoiding stagnation-related negative effects). As explained above, the flow control mechanism of OAE system 100 is implemented by release valve 220 whose operating state is controlled by way of valve control signal 183, which in turn controls the rate at which ocean alkalinity product 113-OUT is delivered into plenum chamber 212 and through exit ports 214 into outfall region 51-1R. In this example the delivery rate of alkalinity into outfall region 51-1R corresponds to the rate at which ocean alkalinity product 113-OUT is delivered into plenum chamber 212. That is, the alkalinity delivery rate is controlled (increased/decreased) by way of controlling (opening/closing) the operating state of release valve 220. Controller 180 functions to receive and process current measured seawater parameter data (i.e., the measured seawater parameters provided with the most recent sensor signal(s) 182 received from sensor(s) 230), to determine a corresponding maximum safe delivery rate based on the current measured seawater parameter data, and to generate and transmit a current valve control signal 183 that causes release valve 220 to enter an operating state that produces the corresponding maximum safe delivery rate. In alternative embodiments, controller 180 may be configured to adjust the operating state of release valve 220 either on a continuous basis or on a periodic basis (e.g., once per second or minute). Continually sensing seawater parameters in the outfall region and controlling the alkaline delivery rate in real-time response to changes in the measured seawater parameters enhances the ability of system 100 to maintain safe seawater conditions in outfall region 51-1R. In addition, utilizing an array of sensors 230, each sensor being respectively located close to an associated exit (alkalinity release) port 214 (or group of exit ports), further enhances the system's ability to maintain safe seawater conditions in outfall region 51-1R by measuring seawater parameters close to each alkalinity release point. For example, locating a turbidity sensor close to each exit port could determine mixing conditions in the sub-region located near each exit port, thereby allowing the system to slow or terminate the delivery of alkalinity if unfavorable mixing conditions arise any of the sub-regions.

Figure 1A:
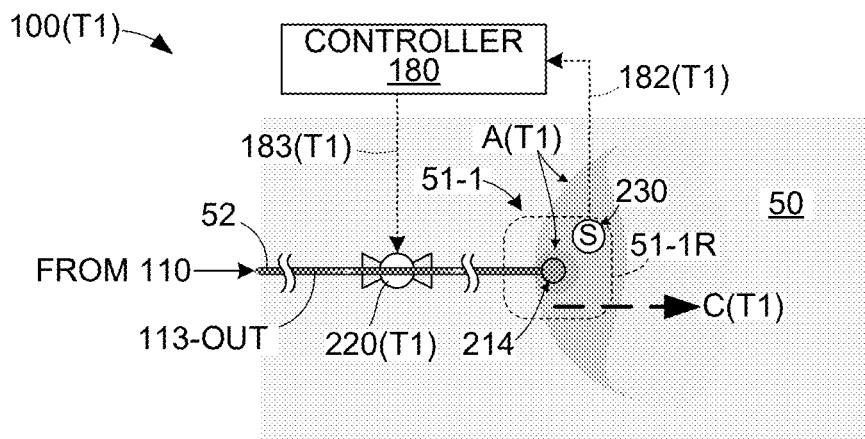
FIGS. 1A, 1B and 1C are top views showing a simplified portion of the release apparatus of FIG. 1 under exemplary operating conditions.
Figure 1B:
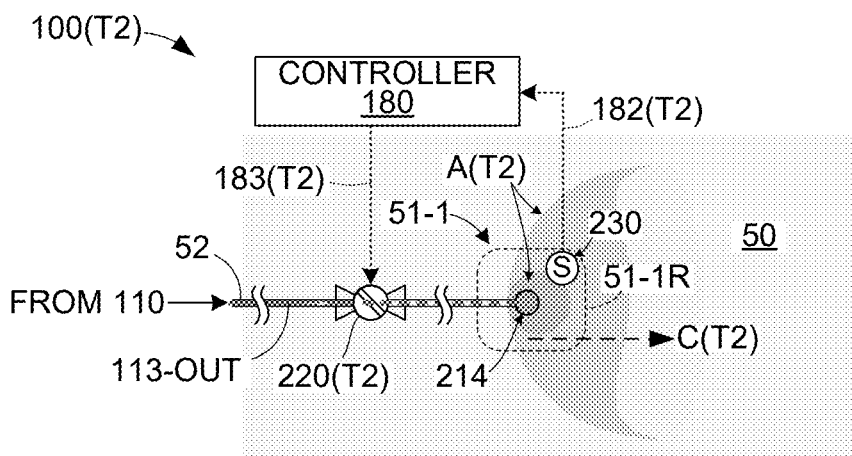
Figure 1C:
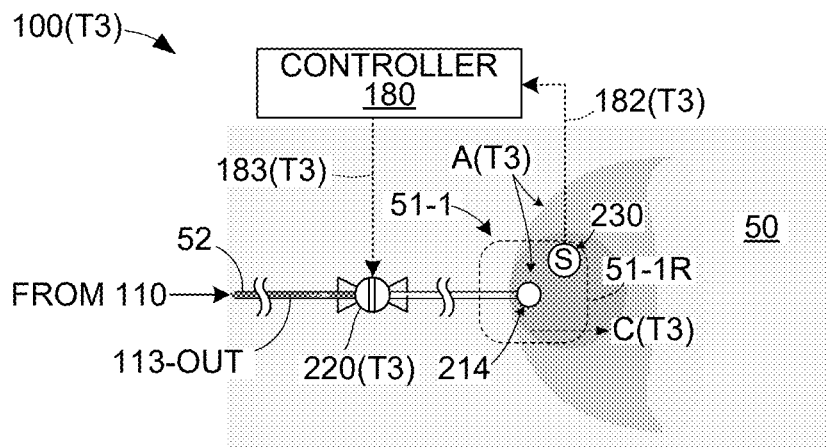

FIGS. 1A to 1C (described below) depict three operating examples that are collectively intended to clarify the definition of "maximum safe delivery rate" in the context of exemplary OAE system 100. Briefly stated, these figures show how current maximum safe delivery rates vary in accordance with changes in measured seawater parameter data. In each figure, the concentration of alkaline material (alkalinity) is depicted by shaded plume regions A, where darker shading indicates higher alkalinity concentrations and lighter shading indicates relatively low alkalinity concentrations.

FIG. 1A depicts a simplified portion of system 100 at a time T1 when outfall location 51-1 is subject to ideal or relatively favorable OAE conditions (e.g., when a relatively strong offshore current C (T1) causes seawater having a relatively low pH level to pass through outfall region 51-1R). As indicated by the shaded alkalinity plume A (T1), the concentration of alkalinity delivered through exit port 214 at time T1 is highest at the release location (i.e., immediately outside exit port 214), and decreases relatively quickly as strong offshore current C (T1) disperses the alkalinity into the ocean regions surrounding outfall region 51-1R. Under these favorable conditions the corresponding seawater parameters measured by sensors 130 and transmitted to controller 180 by way of sensor signals 182 (T1) indicate acceptable conditions (e.g., low or zero precipitation and safe pH levels) because any amount of alkalinity released (ejected) from exit port 214 is relatively quickly moved out of outfall region 51-1R by strong offshore current C (T1)). In response to sensor signals 182 (T1), controller 180 may generate and transmit a valve control signal 183 (T1) (e.g., a zero volt DC signal) that causes release valve 220 to be in a fully open operating/actuation state at time T1, whereby the flow rate of ocean alkalinity product 113-OUT through release valve 220 (T1) is maximized, and hence the delivery rate of alkalinity through exit port 214 into ocean 50 is maximized. That is, under ideal OAE conditions, the maximum safe delivery rate of alkalinity into ocean 50 corresponds to the maximum rate at which ocean alkalinity product 113-OUT can be delivered from BPED 110 and passed by control valve 220 to exit port 214.

FIG. 1B depicts system 100 at a time T2 when outfall location 51-1 is subject to somewhat less favorable OAE conditions (e.g., when a modest to weak offshore current C (T2) passes through outfall region 51-1R). As indicated by alkalinity plume A (T2), the alkalinity passed through exit port 214 at time T2 disperses at an intermediate rate into ocean 50 (i.e., somewhat more slowly than that depicted in FIG. 1A). Under these conditions the corresponding seawater parameters measured by sensors 130 and transmitted to controller 180 by way of sensor signals 182 (T2) may indicate a decrease in seawater current, a small amount of precipitation and/or an unsafe pH level (i.e., because the rate at which alkalinity is moved from exit port 214 out of outfall region 51-1R by current C (T2) is somewhat slower that that associated with stronger current C (T1), described above with reference to FIG. 1A). Therefore, in response to the less optimal parameters indicated by sensor signals 182 (T2), controller 180 generates and transmits a valve control signal 183 (T2) (e.g., a two volt DC signal) that adjusts release valve 220 into a partially open operating/actuation state at time T2, whereby the flow rate of ocean alkalinity product 113-OUT through release valve 220 (T1) may be less than the fully open flow rate described above with reference to FIG. 1A. By continuously or periodically monitoring the real-time parameter seawater measurements in outfall region 51-1R and making corresponding adjustments to the flow rate of ocean alkalinity product 113-OUT through control valve 220 such that both the flow rate of alkalinity delivered to ocean 50 and stagnation-related negative effects are mitigated, system 100 facilitates supplying alkalinity to ocean 50 at a maximum safe delivery rate at all times.

FIG. 1C depicts system 100 at a time T3 when outfall location 51-1 is subject to highly unfavorable OAE conditions (e.g., when relatively weak or completely stagnant offshore current C (T3) passes through outfall region 51-1R). As depicted by the larger dark shaded regions of alkalinity plume A (T3) that surround exit port 214, the alkalinity passed through exit port 214 at time T3 disperses relatively slowly from outfall region 51-1R into the surrounding regions of ocean 50. Under these unfavorable conditions the corresponding seawater parameters measured by sensors 230 and transmitted to controller 180 by way of sensor signals 182 (T3) may indicate at least some precipitation and unsafe (or barely safe) pH levels (i.e., because any amount of alkalinity released from exit port 214 is relatively slowly moved out of outfall region 51-1R by weak current C (T3)). Therefore, in response to sensor signals 182 (T3), controller 180 may generate and transmit a valve control signal 183 (T3) (e.g., a five volt DC signal) that causes release valve 220 to be in a fully closed operating/actuation state at time T3, whereby the flow rate of ocean alkalinity product 113-OUT through release valve 220 (T1), and hence the delivery rate of alkalinity through exit port 214 into ocean 50, is minimized). That is, to prevent stagnation-related negative effects during periods of highly unfavorable OAE conditions, the maximum safe delivery rate of alkalinity into ocean 50 may require entirely preventing the passage of ocean alkalinity product 113-OUT by control valve 220 through exit port 214 into ocean 50. Of course, even under zero seawater current flow conditions, any alkalinity disposed in outfall region 51-1R will eventually diffuse into the surrounding seawater, whereby the pH level measured by sensor 230 may indicate periodic periods of sufficiently safe pH levels to allow intermittent alkalinity deliveries (i.e., although the maximum safe delivery rate may require periodically fully closing release valve 220 during highly unfavorable OAE conditions, system 100 is still able to supply intermittent quantities of alkalinity under these conditions).

In some embodiments controller 180 is configured to implement a control algorithm to process the measured seawater parameter data received by way of sensor signals 182 and to generate an associated valve control signal 183. In some embodiments, this control algorithm utilizes one of a proportional integral derivative, machine learning and/or artificial intelligence to determine whether currently received measured seawater parameter data exceeds a predetermined threshold value, and generates an associated control signal 183 such that release valve 220 reduces or closes (e.g., as described above with reference to FIGS. 1B and 1C) when the measured seawater parameter data indicates that the predetermined threshold value has or soon will be exceeded. For example, the control algorithm may be taught (using known techniques) to recognize certain combinations of measured seawater parameter values (e.g., decreasing ocean current and increasing pH level) that indicate associated threshold values (e.g., conditions under which subsequent delivery of alkalinity at the current delivery rate would produce undesirable precipitation and/or unsafe pH levels), and to adjust valve control signal 183 in a manner that avoids undesirable conditions while maintaining a maximum safe delivery rate (e.g., controlling release valve to either reduce or entirely terminate the flow of ocean alkalinity product 113-OUT to diffuser 210).

In some embodiments, controller 180 controls flow control mechanism 220 (as described above) by way of flow control signal 182, and also controls operations performed by BPED 110 by way of control signals 181 (e.g., as described in U.S. patent application Ser. No. 18/131,839, cited above). Advantages provided by this centralized control arrangement include the ability to decrease or stop the generation of ocean alkalinity product 113-OUT by BPED 110 during prolonged periods of time in which ocean currents may become stagnant (i.e., when the release of alkalinity must be terminated for an extended period to avoid stagnation-related negative effects), thereby avoiding alkalinity storage issues during these periods. In contrast, locating controller 180 near diffuser 210 reduces the reaction time between detecting seawater parameter changes and adjusting the maximum safe delivery rate.

Figure 2A:
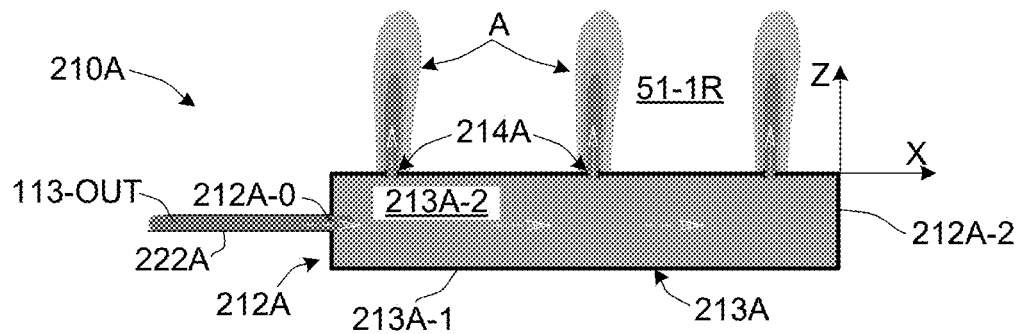
FIGS. 2A, 2B and 2C show diffusers having various exit port features that are utilized by the release apparatus of FIG. 1 according to alternative exemplary embodiments.
Figure 2B:
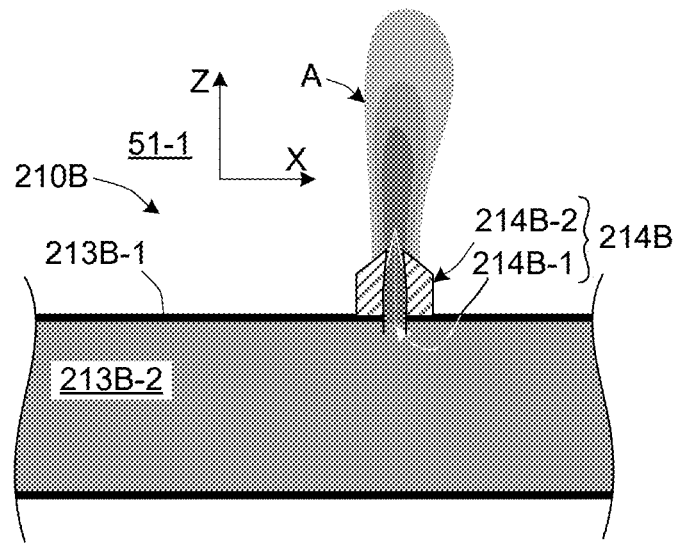
Figure 2C:
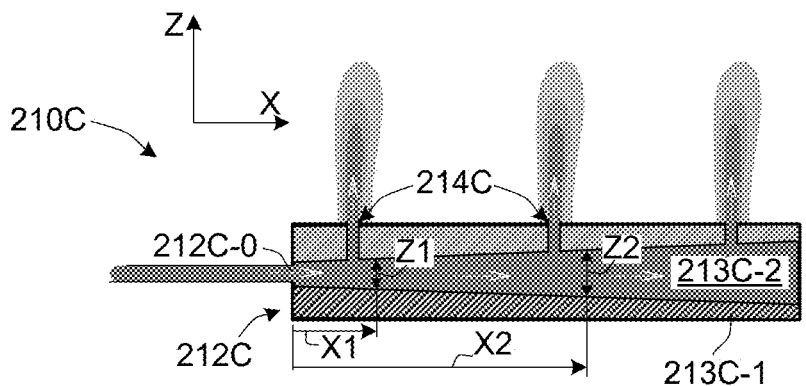

FIGS. 2A, 2B and 2C respectively show plenum chamber features associated with three diffusers 210A, 210B and 210C according to three exemplary embodiments. Although not indicated in FIGS. 2A-2C for clarity and brevity, diffusers 210A, 210B and 210C are understood to include or are operably coupled to at least some of the features (e.g., floats, sensors . . . ) that are described above with reference to FIG. 1.

FIG. 2A depicts a diffuser 210A having a plenum chamber 212A includes an elongated structure 213A having a peripheral wall 213A-1 that surrounds an interior cavity 213A-2 having an entry port (opening) 212D-1 at one end, a closed end 212A-2, and several exit ports 214A disposed in a spaced-apart arrangement along its length (i.e., in the X-axis direction). Entry port 212D-1 is operably coupled to receive ocean alkalinity product 113-OUT from a feedline 222A (i.e., such that, when the flow control mechanism is opened as described above, ocean alkalinity product 113-OUT flows through entry port 212A-1 into interior cavity 213A-2). Peripheral wall 213A-1 may have a round, square or other cross-sectional shape. Each exit port 214A is an opening/hole formed through peripheral wall 213A-1 and configured to direct outflowing ocean alkalinity product 113-OUT in an outward direction (e.g., in the Z-axis direction, as indicated in FIG. 2A). With this arrangement, plenum chamber 212A acts as a type of pressure vessel that maintains the ocean alkalinity product disposed inside interior cavity 213A-2 at a higher pressure than that of the seawater disposed in outflow region 51-1R (i.e., outside peripheral wall 213A-1), whereby a portion of the pressurized ocean alkalinity product passes through each exit port 214A and into the seawater disposed outside plenum chamber 212A, thereby delivering alkalinity that disperses into outfall region 51-1R (e.g., as depicted by alkalinity plumes A).

FIG. 2B shows a partial diffuser 210B that, similar to diffuser 210A (FIG. 2A), includes a plenum chamber 213B having a peripheral wall 213B-1 surrounding an interior cavity 213B-2, and includes at least one exit port 214B disposed along its length. In this embodiment exit port 214B includes a nozzle 214B-2 that is operably coupled to peripheral wall 213B-1 over an associated opening/hole 214B-1, where nozzle 214B-2 is configured such that a flow rate of the ocean alkalinity product passing from interior cavity 213B-2 through associated opening/hole 214B-1 is controlled by nozzle 214B-2, for example, such that the outflow rate is tuned to the maximum safe delivery rate, and such that each alkalinity plume A is directed in a desired direction/trajectory (e.g., in the Z-axis direction) and with a desired velocity, whereby the alkalinity (base substance) is biased toward the ocean surface to maximize carbon capture.

FIG. 2C shows a diffuser 210C that, similar to diffuser 210A (FIG. 2A) includes a plenum chamber 212C having an elongated peripheral wall structure 213C-1 surrounding an interior cavity 213C-2, an entry port 212C-1 at one end and spaced-apart exit ports 214C disposed along its length. Diffuser 210C differs from diffuser 210A in that peripheral wall 213C-1 of elongated structure 213C is configured such that a cross-sectional dimension of interior cavity 213C-2 changes (e.g., increases) in relation to a distance from entry port 212C-1. For example, as indicated in FIG. 2C, interior cavity 213C-2 has a cross-sectional dimension (e.g., diameter) $Z1$ at a distance $X1$ from entry port 212C-1 and has a cross-sectional dimension $Z2$ at a distance $X2$ from entry port 212C-1, where dimension $Z2$ is larger than dimension $Z1$ and distance $X2$ is larger than distance $X1$. The changing dimension of interior cavity 213C-2 is configured to regulate the fluid pressure such that the flow of ocean alkalinity product through each hole/opening 214C is uniform (i.e., such that the flow rate through each hole/opening is essentially the same). In another embodiment the regulation of flow may be further controlled by way of nozzles (not shown) that operate as described above with reference to FIG. 2B.

FIGS. 3A, 3B, 3C and 3D depict exemplary plenum chamber portions of four diffusers configured in accordance with various specific embodiments in which exit ports are arranged in one of: (i) a one-dimensional (1D) configuration, (ii) a two-dimensional (2D) configuration, and (iii) a three-dimensional (3D) configuration. Although not shown for brevity, each of the depicted exemplary embodiments may be further modified to include one or more of the features (e.g., sensors and nozzles) described above with reference to FIGS. 2A to 2C.

Figure 3A:
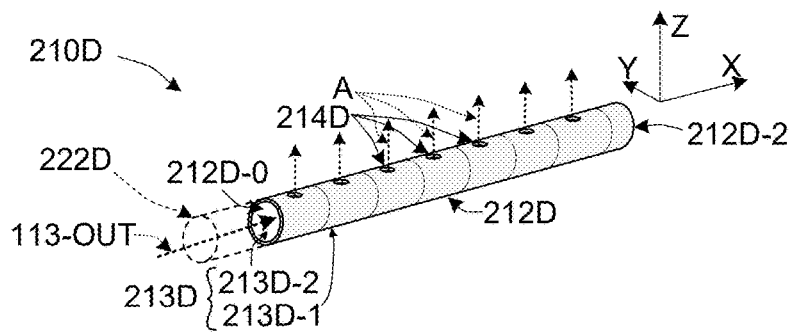
FIGS. 3A, 3B, 3C and 3D show depict alternative diffuser plenum chamber portions utilized by the release apparatus of FIG. 1 according to exemplary embodiments.

FIG. 3A depicts an exemplary diffuser 210D including a plenum chamber 212D having an elongated structure 213D including a cylindrical (pipe-like) peripheral wall 213D-1 (e.g., a straight section of PVC pipe or straight tubing comprising plastic or other suitable material) surrounding an elongated interior cavity 213D-2. Exit ports 214D (openings/holes extending through peripheral wall 213D-1) are arranged in a linear, spaced-apart 1D configuration (i.e., aligned in the lengthwise (X-axis) direction along cylindrical peripheral wall 213D-1). An entry port 212D-1 is disposed located at one end of cylindrical peripheral wall 213D-1 and an opposing second end 212D-2 is covered by a plate or other blocking structure, whereby ocean alkalinity product 113-OUT forced into interior cavity 213D-2 through entry port 212D-0 is expelled through exit ports 214D. Exit ports 214D are formed through peripheral wall 213D-1 and arranged such that, when plenum chamber 212D is oriented as indicated in FIG. 3A, all of exit ports 214D are aligned along the uppermost portion of plenum chamber 212D. In addition, exit ports 214D are configured/oriented in an upward direction such that ocean alkalinity product 113-

OUT forced into interior cavity 213D-2 through entry port 212D-0 (e.g., as indicated by the dashed-line arrow that is parallel to the X-axis) is redirected perpendicular to the axial direction of plenum chamber 212D (i.e., upward) as it is expelled from exit ports 214D, thereby forming alkalinity plumes A (indicated by the dashed-line arrows that are parallel to the Z-axis). This arrangement provides a series of directed outlet orifices (or nozzles) that produce multiple spaced-apart alkalinity plumes A, each having a proper trajectory (i.e., toward the ocean surface) and velocity that improve alkaline material distribution for purposes of capturing atmospheric $CO_2$ and minimizing sunken/wasted alkaline material.

Figure 3B:
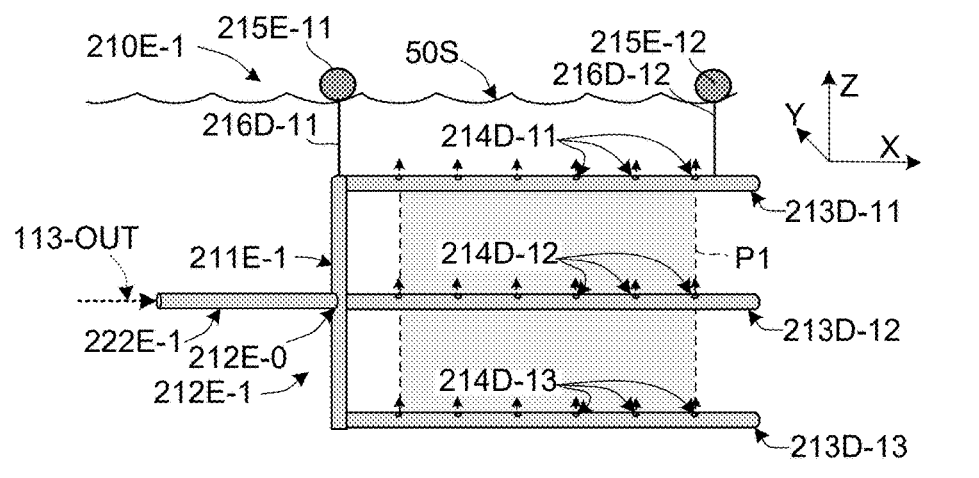

FIG. 3B depicts a second exemplary diffuser 210E-1 including a plenum chamber 212E-1 formed by a branching structure 211E-1 and three elongated structures 213E-11, 213D-12 and 213D-13. Branching structure (e.g., a plastic pipe-like structure) 211E-1 is operably coupled to receive ocean alkalinity product 113-OUT from a feedline 222E-1/2 by way of an entry port 212E-0 and elongated structures 213D-11, 213-12 and 213-13 extend in parallel from branching structure 211E-1/2 and are operably coupled to receive portions of ocean alkalinity product 113-OUT from branching structure 211E-1/2. Each elongated structure 213D-11, 213D-12 and 213D-13 of plenum chamber 212E-1 is substantially identical to structure 213D of plenum chamber 212D (described above with reference to FIG. 3A). Diffuser 210E-1 is configured (e.g., by way of floats 215E-11 and 215E-12 and associated tethers 216E-11 and 216E-12) to orient plenum chamber 212E-1 in its designated outfall region such that elongated structures 213D-11, 213D-12 and 213D-13 are maintained in a vertical (X/Z) plane P1, whereby exit ports 214D-11, 214D-12 and 214D-13 are arranged in a vertically oriented 2D configuration.

Figure 3C:
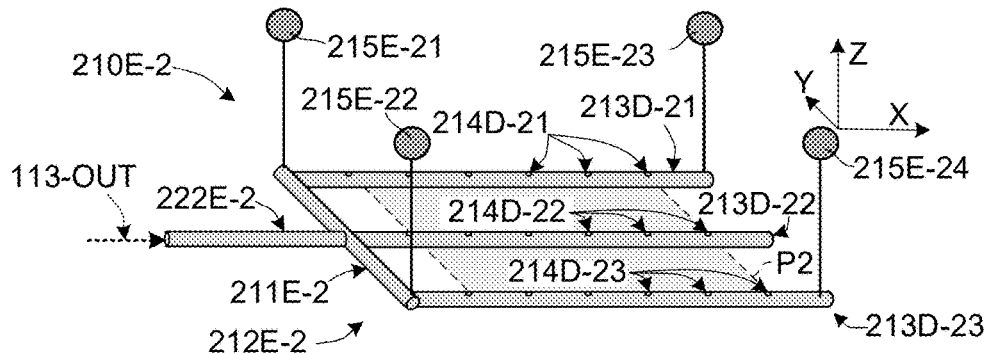

FIG. 3C depicts a third exemplary diffuser 210E-2 including a plenum chamber 212E-2 and four floats 215E-21 to 215E-24. Similar to plenum chamber 212E-1 (FIG. 3B), plenum chamber 212E-2 three elongated structures 213E-21, 213D-22 and 213D-23 that extend in parallel from a branching structure 211E-2 and are operably coupled to receive portions of ocean alkalinity product 113-OUT, which flows from a feedline 222E-2 through branching structure 211E-2 and into the elongated structures. Each elongated structure 213D-21, 213D-22 and 213D-23 is substantially identical to structure 213D of plenum chamber 212D (described above). Diffuser 210E-2 is configured (e.g., by way of floats 215E-21, 215E-22, 215E-23 and 215E-24 and associated tethers 216E-21, 216E-22, 216E-23 and 216E-24) to orient plenum chamber 212E-2 in its designated outfall region such that elongated structures 213D-21, 213D-22 and 213D-23 are maintained in a horizontal (X/Y) plane P2, whereby exit ports 214D-21, 214D-22 and 214D-23 are arranged in a horizontally oriented 2D configuration.

Figure 3D:
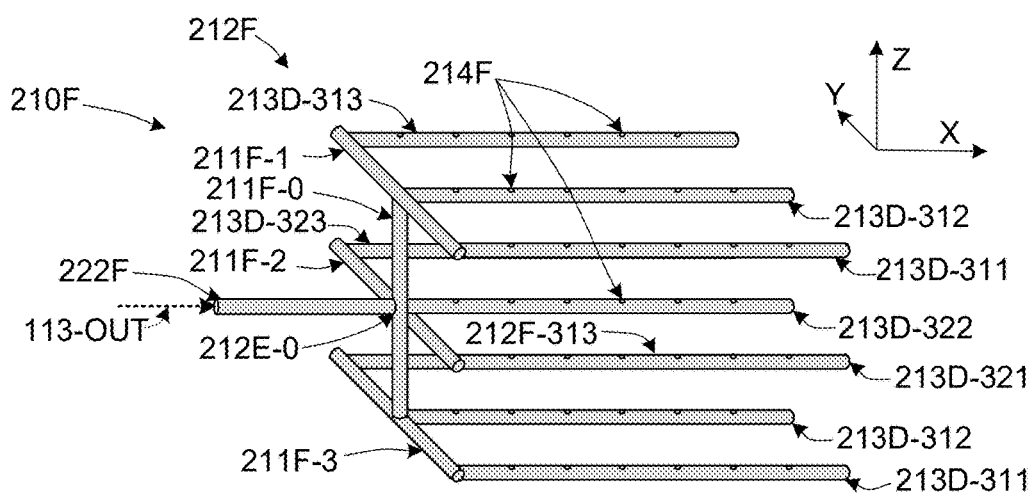

FIG. 3D depicts a fourth exemplary diffuser 210F including a plenum chamber 212F including nine elongated pipe-like members 212D-311 to 212D-333 that collectively provide exit ports 214F arranged in a 3D arrangement (i.e., three horizontal (X/Y) and three vertical (X/Z) planes). Specifically, plenum chamber 212F includes a central branching structure 211F-0 that receives ocean alkalinity product 113-OUT from a feedpipe 222F by way of an entry port 212F-0 and distributes the received ocean alkalinity product 113-OUT to secondary branching structures 211F-1, 211F-2 and 211F-3 by way of corresponding openings/ports. Elongated members 213D-311, 213D-312 and 213D-313 extend in parallel from secondary branching structure 211F-1 and collectively provide exit ports disposed in a first (lowermost) horizontal plane. Elongated members 213D-321, 213D-322 and 213D-323 extend in parallel from secondary branching structure 211F-2 and collectively provide exit ports disposed in a second (intermediate) horizontal plane. Elongated members 213D-331, 213D-332 and 213D-333 extend in parallel from secondary branching structure 211F-3 and collectively provide exit ports disposed in a third (uppermost) horizontal plane. Associated elongated members (e.g., members 213D-313, 213D-323 and 213D-333) may be aligned in vertical planes. Similar to the arrangements described above with reference to FIGS. 3B and 3C, each of the nine elongated pipe-like members 213F-311 to 213F-333 receives a portion of ocean alkalinity product 113-OUT (i.e., by way of branching structures 211F-0 and an associated one of branching structures 211F-1, 211F-2 and 211F-3) and delivers alkalinity to the surrounding seawater by way of an associated group of exit ports 214F. Although omitted from FIG. 3D for clarity, plenum structure 212F is maintained in a desired orientation by way of floats (e.g., in a manner similar to that depicted in FIG. 3C). With this arrangement, diffuser 210F is configured such that the exit port groups disposed on elongated pipe-like structures 212D-311 to 212D-333 are disposed in a 3D configuration. In one embodiment, regions of sensor signals could be processed and mapped for interventions and optimal operations for the entire diffuser/port delivery network. Sensing is not limited to turbidity, and may include: pH, alkalinity, DIC (dissolved inorganic carbon dioxide), temperature, salinity, current speed and/or direction.

Figure 4A:
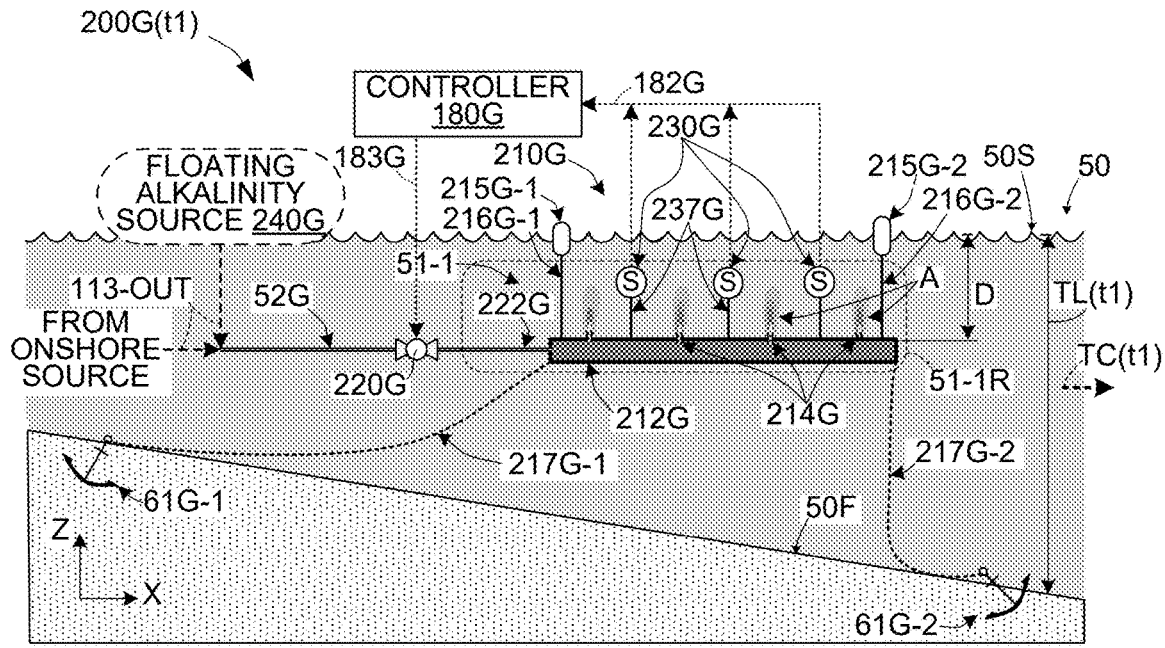
FIGS. 4A and 4B are simplified side views showing a plenum anchoring arrangement according to an exemplary embodiment.

FIG. 4A shows a release mechanism 200G including a diffuser 210G, a flow control mechanism 220G, sensors 230G, and a controller 180G. Diffuser 210G is disposed at an outfall location 51-1 in ocean 50 and includes at least one plenum chamber 212G defining exit ports 214G. Plenum chamber 212G receives ocean alkalinity product 113-OUT by way of a feedline 222G and ejects the received ocean alkalinity product into seawater 51 through exit ports 214G in the manner described above. Plenum chamber 212G is depicted as a single elongated structure for clarity and brevity and may be implemented using any of the various plenum chamber configurations described herein. Flow control mechanism (e.g., a release valve or a pump) 220G is coupled to receive ocean alkalinity product 113-OUT by way of a transfer pipe/hose 52G from an alkalinity source (e.g., either an onshore source such as BPED 110, shown in FIG. 1, or an optional floating alkalinity source 240G, such as a barge-mounted storage tank), and is configured to control a delivery rate of ocean alkalinity product 113-OUT through plenum chamber 212G and exit ports 214G such that the base substance (alkalinity) provided in ocean alkalinity product 113-OUT diffuses into seawater 51 located in an outfall region 51-1R surrounding diffuser 210G. Sensors 230G are disposed in outfall region 51-1R and are configured (using known techniques) to measure at least one seawater parameter (e.g., one or more of ionic composition [hardness], turbidity, pH, alkalinity, DIC, temperature, salinity, current speed and/or direction) of the portion/volume of seawater located in outfall region 51-1R. Sensors 230G are also configured (using known techniques) to generate and transmit sensor signals 182G including data corresponding to the measured seawater parameter(s). Controller 180G is configured to receive sensor signals 182G and to control an operating state of flow control mechanism 220G (by way of a valve control signal 183G) in accordance with the measured seawater parameters such that the base substance (alkalinity) passes through exit ports 214 and forms alkalinity plumes A in outfall region 51-1R at a maximum safe delivery rate (i.e., a flow rate that maximizes the amount of alkalinity delivered into outfall region 51-1R while avoiding stagnation-related negative effects). In alternative embodiments, release mechanism 200G may be part of an OAE system (i.e., wherein ocean alkalinity product 113-OUT is supplied from BPED 110, as shown in FIG. 1), or may be a stand-alone system used to deliver alkalinity supplied from an onshore alkalinity source or floating alkalinity source 240G to ocean 50.

Figure 4B:
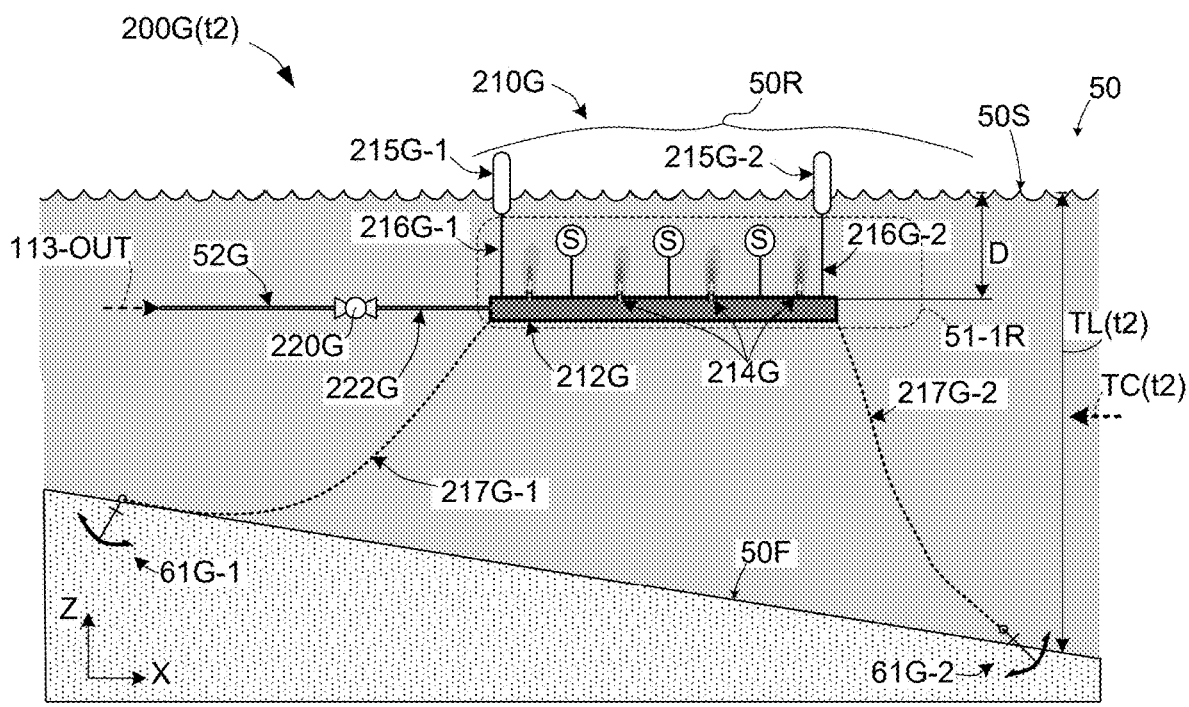

As depicted in FIGS. 4A and 4B, plenum chamber 212G is maintained within designated outfall region 51-1R by way of one or more floating structures and one or more anchor points. Referring to FIG. 4A, in one embodiment plenum chamber 212G is suspended from two floating structures 215G-1 and 215G-2 by way of tethers 216G-1 and 216G-2 such that exit ports 214G are maintained in a horizontal plane and at a predetermined depth D (e.g., a meter or two) below ocean surface 50S under normal operating conditions. Note that plenum chamber 212G is weighted or otherwise configured with a negative buoyancy (downward bias) such that each tether 216G-1 and 216G-2 is continuously pulled taut against the upward bias provided by floating structures, whereby the two opposing ends of plenum chamber 212G are suspended at predetermined depth D (e.g., at a depth equal to the lengths of tethers 216G-1 and 216G-2). With this arrangement, all of exit ports 214G are maintained at predetermined optimal depth D under all tidal conditions (e.g., as indicated in FIG. 4A, at time t1 when a nominal tide level TD (t1) of ocean surface 50S is relatively low, and, as indicated in FIG. 4B, at a time t2 when a nominal tide level TD (t2) is relatively high). In addition, plenum chamber 212G is connected to two or more anchor points (e.g., anchors 61G-1 and 61G-2 attached to ocean floor 50F and connected to plenum chamber 212G by chains or other securing structures 217G-1 and 217G-2, respectively) such that plenum chamber 212G is maintained within designated outfall region 51-1R under all tidal conditions. For example, as indicated in FIG. 4A, during outflowing tidal currents (ebb currents) TC (t1), the offshore drift of plenum chamber 212G is limited by anchor 61G-1 and securing structure 217G-1. Conversely, as indicated in FIG. 4B, during inflowing tidal currents (flood currents) TC (t1), the shoreward drift of plenum chamber 212G is limited by anchor 61G-2 and securing structure 217G-2. As depicted in FIGS. 4A and 4B, the floating structures and anchor points maintain plenum chamber 212G at optimal depth D and within designated outfall region 51-1R under all tidal and seasonal water fluctuations.

According to another aspect, diffuser 210G includes multiple sensors 230G, where each sensor 230G is operably positioned (e.g., by way of securing structures 237G) and configured to measure seawater parameters adjacent to one or more associated exit ports 214G. In some embodiments, some of sensors 230G may be configured to measure turbidity or tidal flow in order to determine local mixing conditions in the seawater adjacent to an associated exit port, thereby facilitating the generation of a release valve control signal that causes the release valve (not shown) to reduce or terminate the ocean alkalinity product delivery flow rate through feedline 222G when (i) excessive turbidity (which may indicate the precipitation of calcite/brucite, or (ii) insufficient tidal flow (which may produce insufficient mixing of the ocean alkalinity product and seawater) is detected near one or more exit ports 214G. As mentioned above, in some embodiments at least some of sensors 230G may be further configured to detect (sense) a condition that exceeds a predetermined threshold value or combination of predetermined threshold values (e.g., a maximum allowable pH level, or a combination of a normal pH level and a minimal seawater current flow rate through the outfall region). In each case, the controller (not shown) associated with diffuser 210G may transmit control signals that implement a corrective action, such as to change the operating state of the associated release valve (not shown) to reduce or terminate the ocean alkalinity product delivery flow rate through feedline 222G until the condition improves.

Figure 5:
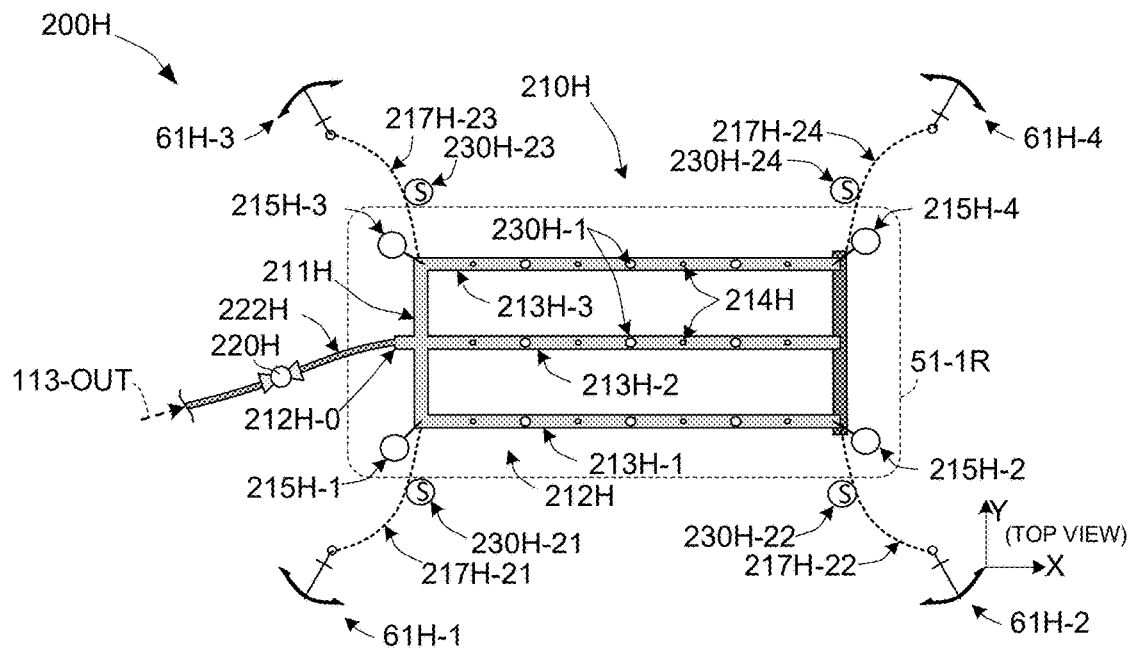
FIG. 5 is a simplified top view showing a plenum anchoring arrangement according to another exemplary embodiment.

FIG. 5 is a top plan view showing a release apparatus 200H including a diffuser 210H, a flow control mechanism 220H, sensors 230H, and a controller (not shown). Diffuser 210H is disposed at an outfall location in an ocean and includes at least one plenum chamber 212H having elongated structures 213H-1 to 213H-3 that define multiple exit ports 214H. Plenum chamber 212H receives ocean alkalinity product 113-OUT by way of a feedline 222H and ejects the received ocean alkalinity product into the surrounding seawater through exit ports 214H in the manner described above. Similar to the embodiment described above with reference to FIG. 3C, plenum chamber 212H includes a branching structure 211H that receives ocean alkalinity product 113-OUT by way of an entry port 212H-0 and feeds portions of ocean alkalinity product 113-OUT to each of three elongated pipe-like structures 212H-1, 212H-2 and 212H-3 that are arranged in a horizontal X/Y plane, where each elongated structure 212H-1, 212H-2 and 212H-3 includes an associated group of exit ports 214H and sensors 230H-1 that are arranged and function as described above with reference to FIG. 4A. Flow control mechanism (e.g., a release valve or a pump) 220H is coupled to receive ocean alkalinity product 113-OUT by way of a transfer pipe/hose 52H from an alkalinity source (e.g., either an onshore alkalinity source or a floating alkalinity source), and is configured to control a delivery rate of ocean alkalinity product 113-OUT through plenum chamber 212H and exit ports 214H such that the base substance (alkalinity) provided in ocean alkalinity product 113-OUT diffuses into the seawater located in an outfall region 51-1R surrounding diffuser 210H. Sensors 230H are disposed in outfall region 51-1R and are configured (using known techniques) to measure at least one seawater parameter (e.g., one or more of ionic composition [hardness], turbidity, pH, alkalinity, DIC, temperature, salinity, current speed and/or direction) of the portion/volume of seawater located in outfall region 51-1R. Sensors 230G are also configured (using known techniques) to generate and transmit sensor signals including data corresponding to the measured seawater parameter(s) to the controller (not shown), which is receive and process the sensor signals and to generate/transmit flow control signals that control the operating state of flow control mechanism 220G in accordance with the measured seawater parameters such that the base substance passes through exit ports 214H into outfall region 51-1R at a maximum safe delivery rate. In alternative embodiments, release mechanism 200H may be part of an OAE system or may be a stand-alone system.

According to an aspect of the embodiment depicted in FIG. 5, plenum chamber 212H is suspended from four floating structures 215H-1, 215H-2, 215H-3 and 215H-4 by way of associated tethers in the manner described above with reference to FIG. 4A. This arrangement facilitates maintaining all three elongated structures 212H-1 to 212H-3 (and, hence, all exit ports 214H) at the same predetermined optimal depth below the ocean's surface (i.e., such that elongated structures 212H-1, 212H-2 and 212H-3 are submerged and maintained in an X-Y plane).

According to another aspect, plenum chamber 212H is maintained in outfall region 51-1R by way of connecting to four anchor points. In the example shown in FIG. 5, plenum chamber 212H is maintained in outfall region 51-1R by anchors 61H-1, 61H-2, 61H-3 and 61H-4, which are anchored to (i.e., securely sunk or dug into) four corresponding anchor points (locations) on the ocean floor, and are respectively connected to plenum chamber 212H by securing structures 217H-1, 217H-2, 217H-3 and 217H-4 (e.g., chains or ropes). With this arrangement, plenum chamber 212H is movably maintained in two dimensions within designated outfall region 51-1R under all tidal and seasonal water fluctuations.

According to a third aspect of the embodiment depicted in FIG. 5, diffuser 210F further includes one or more (second) sensors that are configured to measure speed and direction of the ocean current passing through outfall region 51-1R (i.e., acting on plenum chamber 212H), and to provide corresponding ocean current data to the controller (not shown). In the depicted embodiment, the ocean seawater's current speed and direction are measured by way of sensors 230H-21, 230H-22, 230H-23 and 230H-24, which are respectively attached to securing structures (e.g., chains) 217H-21, 217H-22, 217H-23 and 217H-24. In some embodiments, sensors 230H-21 to 230H-24 are implemented using load cells, torque sensors, tension sensors or other sensor types that are configured to measure the tensile forces exerted on each chain 217H-21 to 217H-24, and to transmit associated sensor signals including the measured force values to the controller (not shown). In some embodiments, sensors 230H-21 to 230H-24 are configured to measure the position (e.g., polar direction) of at least one chain 217H-21 to 217H-24 and/or the speed/direction of seawater moving past at least one chain 217H-21 to 217H-24, and to transmit associated sensor signals including the measured current direction values to the controller. The controller is configured to utilize the sensor data to measure seawater current speeds and direction in real time, and to control the flow rate of ocean alkalinity product to plenum chamber 212H in accordance with the measured current conditions. For example, when the second sensor data indicates reduced or onshore ocean currents, which reduces the mixing capacity of the receiving seawater, the controller may adjust the flow control signal accordingly (i.e., such that the operating state of flow control mechanism 220H is adjusted to reduce the flow rate of ocean alkalinity product to diffuser 212H). In some embodiments the sensor data collected from sensors 230H-21 to 230H-24 over a period time may be utilized to generate an oceanographic model that predicts seasonal ocean current speeds and directions at the outfall location. Such oceanographic models may be utilized in conjunction with other sensor data that tracks the spatial and temporal characteristics of the delivered alkaline plumes to generate an optimal strategy for controlling the release of alkalinity in a way that maximizes the effectiveness of carbon dioxide removal.

Figure 6:
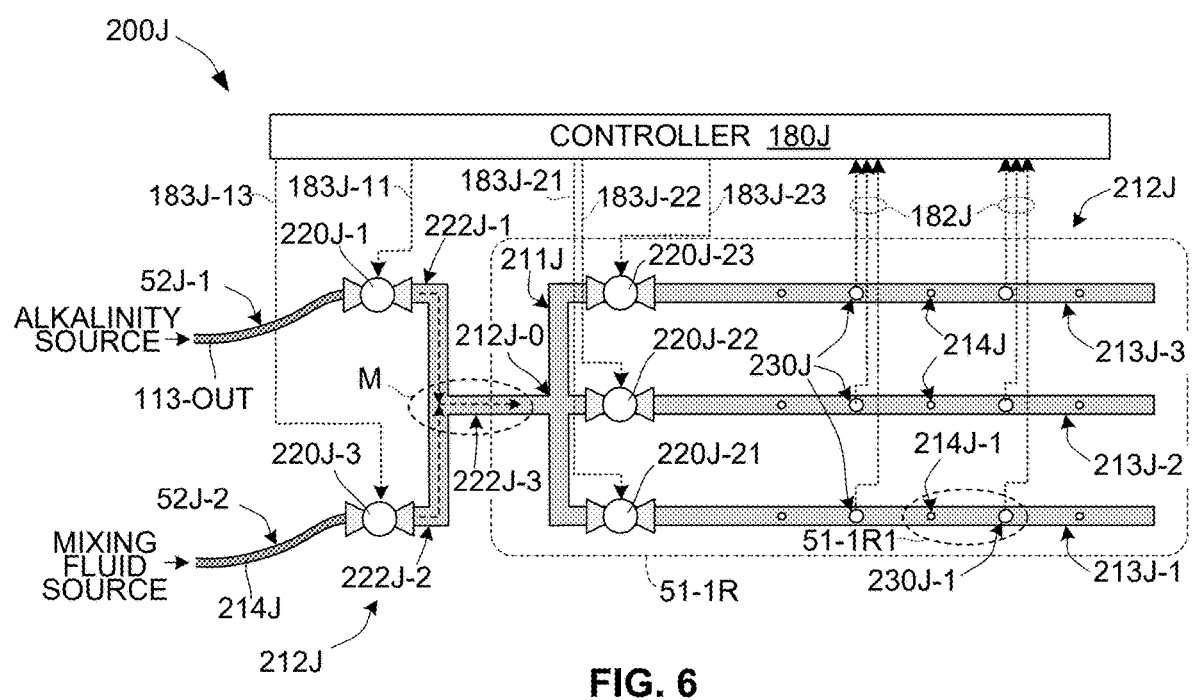
FIG. 6 shows a simplified release apparatus according to another embodiment of the present invention.

FIG. 6 depicts a release apparatus 200J according to another exemplary embodiment. Similar to the embodiments described above, release apparatus 200J includes a diffuser 210J, a (first) flow control mechanism (release valve) 220J-1, sensors 230J and a controller 180J. Diffuser 210J includes a plenum chamber 212J disposed in an outfall region 51-1R and including multiple elongated pipe-like structures 213J-1, 213J-2 and 213J-3 that are arranged in parallel and respectively operably communicate with an entry port 212J-0 by way of a branching structure 211J, where each plenum chamber member 212J-1 to 212J-3 includes an associated group of exit ports 214J and an associated group of sensors 230J that are arranged and function in a manner similar to that described above with reference to FIG. 4A or FIG. 4B. Release valve 220J-1 is coupled to receive ocean alkalinity product 113-OUT from an onshore or floating alkalinity source by way of a transfer pipe/hose 52J-1, and controllably provides a portion of ocean alkalinity product 113-OUT through an entry port 212J-0 into plenum chamber 212J by way of a feedpipe 222J-1. Controller 180J is configured to receive and process sensor signals 182J from sensors 230J and to control the flow of ocean alkalinity product 113-OUT through flow control mechanism 220J-1 to diffuser 210J by way of flow control signal 183J-11, which is generated in accordance with measured seawater parameter data provided by way of sensor signals 182J in a manner similar to that described above.

Release apparatus 200J differs from previous embodiments in that diffuser 210J includes secondary flow control mechanisms 220J-21, 220J-22 and 220J-23 respectively operably configured to independently pass ocean alkalinity product 113-OUT from branching structure 211J to an associated elongated member 213J-1, 213J-2 and 213J-3. As in previous embodiments, each of elongated members 213J-1 to 213J-3 includes a group of exit ports 214J and an associated group of sensors 230J, where each sensor 230J is configured to measure seawater parameters in an associated outfall sub-region located adjacent to one or more associated exit ports 214J. For example, sensor 230J-1 may be configured to measure local mixing conditions of seawater in an outfall sub-region 51-1R1 into which alkalinity is delivered from an associated exit port 230J-1). In one embodiment each flow control mechanism 220J-1 to 220J-3 is an electrically operated valve (e.g., a solenoid valve) that is controlled (i.e., opened/closed) by way of a corresponding control signal 183J-1, 183J-2 and 183J-3. Secondary flow control mechanisms 220J-1, 220J-3 and 220J-3 are operably coupled to supply ocean alkalinity product 113-OUT from branching structure 211J to associated elongated members 213J-1, 213J-2 and 213J-3, respectively. In addition, controller 180J is further configured to process sensor data 182J in a way that facilitates measuring seawater parameters in outfall sub-regions located along each elongated member 213J-1, 213J-2 and 213J-3, thereby facilitating localized control of the flow of alkalinity to selected elongated members of plenum chamber 212J. For example, if sensor 230J-1 generates turbidity sensor data indicating that local mixing conditions in sub-region 51-1R1 exceed a predetermined threshold value, and all other sensors 230J generate sensor data indicating that local mixing conditions are below the threshold value, then controller 180J may restrict or close flow control valve 220J-21 (i.e., by way of terminating or otherwise altering control signal 183J-21), thereby slowing or stopping the delivery/flow of alkalinity along elongated member 213J-1 to exit port 214J-1 (i.e., while maintaining the open operating state of flow control valves 220J-22 and 220J-23). This arrangement may be utilized to control the localized release of ocean alkalinity product from regions or arrays of operation on large area diffusers (e.g., having more than three parallel plenum chamber members arranged in 2D or 3D configurations), thereby facilitating safe and efficient ocean alkalinity enhancement by way of release apparatuses capable of reducing atmospheric $CO_2$ at an enhanced rate. Note that additional secondary flow control mechanisms may be utilized (e.g., by way of including two or more mechanisms along the length of each elongated member 213J-1 to 213J-3) to further enhance localized alkalinity release control.

Referring to the lower left portion of FIG. 6, release apparatus 200J is further distinguished from the above-described embodiments by way of including a mixing valve (third flow control mechanism) 220J-3 that is operably coupled (e.g., by way of secondary transfer pipe/hose 52J-2) to receive a mixing fluid 114J (i.e., a buffer or supporting electrolyte, e.g., a high sea mineral water stream, a reject stream from nanofiltration, or another solution that, when mixed with ocean alkalinity product 113-OUT, causes the buffer equilibrium to shift yielding a lower pH). The downstream end of mixing valve 220J-3 is coupled to the upstream end of entry port 212J-0 by a secondary feedpipe 222J-2 and a mixing pipe 222J-3, which also receives ocean alkalinity product 113-OUT passed through valve 220J-1 and therefore serves as a mixing apparatus such that mixing fluid 114J passed through mixing valve 220J-3 mixes with the amount of ocean alkalinity product 113-OUT passed through flow control mechanism 220J-1 (i.e., as indicated by the dashed-lined arrows disposed in mixing region M) before passing through entry port 212J-0 into branching structure 211J. In other embodiments a different mixing apparatus may be utilized to perform this mixing function (i.e., cause intermixing of mixing fluid 114J passed through mixing valve 220J-3 with ocean alkalinity product 113-OUT passed through release valve 220J-1 before the resulting mixture passes through the upstream end of the entry port 212J-0 into plenum chamber 212J). Similar to release valve 220J-1, mixing valve 220J-3 may be a metering or control valve, or may be implemented using a pump or other flow control mechanism, and the operating state (i.e., fully opened, partially opened, or fully closed) of mixing valve 220J-3 is controlled by way of a control signal 183J-13, which is generated by controller 180J in accordance with sensor signals 182J. In this manner, controller 180J is configured to control flow control mechanism 220J-1 and mixing valve 220J-3 in response to sensor data 182J such that the alkalinity delivery rate (i.e., the flow rate of the base substance through exit ports 214J) into outfall region 51-1R is determined by the combined amount of ocean alkalinity product 113-OUT passed through flow control mechanism 220J-1 and mixing fluid 114J passed through mixing valve 220J-3.

In some embodiments controller 180J is further configured to coordinate the control of both the flow control mechanism/release valve 220J-1 and mixing valve 220J-3 in response to sensor data 182J such that the fluid pressure inside plenum chamber 212J remains constant. As explained above, the delivery rate of alkalinity (base substance) through the array of exit ports 214J into the ocean's seawater located in outfall region 51-1R is determined by the amount (flow rate) of ocean alkalinity product 113-OUT into plenum chamber 212J. In cases where ocean alkalinity product 113-OUT is the only fluid flowing into plenum chamber 212J, increasing (or decreasing) the alkalinity delivery rate into outfall region 51-1R necessarily requires increasing (or reducing) the amount (flow rate) of ocean alkalinity product 113-OUT directed into plenum chamber 212J (i.e., by way of adjusting the operating state of release valve 220J-1), and this increased/reduced ocean alkalinity product flow rate causes a corresponding increase/decrease in the fluid pressure inside plenum chamber 212J. Changes in the fluid pressure inside plenum chamber 212J can produce significant corresponding changes in the delivery of alkalinity into outfall region 51-1R, which in turn can make it more difficult to predict alkalinity dispersion into the seawater surrounding outfall region 51-1R. In one embodiment, coordinating the operation of flow control mechanism/release valve 220J-1 and mixing valve 220J-3 to maintain a constant fluid pressure inside plenum chamber 212J involves simultaneously adjusting the flow rate of mixing fluid 114J in an indirect proportion to changes in the flow rate of ocean alkalinity product 113-OUT (i.e., such that the total combined flow rate of ocean alkalinity product 113-OUT and mixing fluid 114J through entry port 212J-0 into plenum chamber 212J remain constant). For example, when the operating state of release valve 220J-1 is changed to reduce the flow rate of ocean alkalinity product 113-OUT, the operating state of mixing valve 220J-3 is proportionally changed to increase the flow rate of ocean alkalinity product 113-OUT. Conversely, when the operating state of release valve 220J-1 is changed to increase the flow rate of ocean alkalinity product 113-OUT into plenum chamber 212J, the operating state of mixing valve 220J-3 is proportionally changed to decrease the flow rate of ocean alkalinity product 113-OUT into plenum chamber 212J. This cooperative control arrangement facilitates adjusting (increasing/decreasing) the alkalinity delivery rate into outfall region 51-1R without changing the fluid pressure inside plenum chamber 212J, whereby the alkalinity dispersion pattern remains relatively predictable for all alkalinity delivery rates.

Although the invention is primarily described herein in the context of an OAE system, various novel aspects described herein may be beneficially utilized in a stand-alone alkaline release apparatus or in a release apparatus utilized as part of other systems without departing from the spirit and scope of the invention. It will be clear to those skilled in the art that the inventive features of the present invention are applicable to these other embodiments as well, and that all of which are intended to fall within the scope of the present invention.

The invention claimed is:

1. An OAE system including an electrochemical reactor configured to generate an ocean alkalinity product including a base substance that is fully dissolved in an aqueous solution, the OAE system comprising:
    a release apparatus including:
        a diffuser disposed at an outfall location in an ocean and including a plenum chamber defining the at least one exit port and a floating structure operably connected to the plenum chamber such that the plenum chamber is maintained at a depth below an ocean surface of the ocean with the at least one exit port aimed toward the ocean surface,
        a flow control mechanism configured to control a delivery rate of the ocean alkalinity product from the plenum chamber through the at least one exit port such that the base substance diffuses into seawater located in an outfall region surrounding the diffuser,
        a sensor disposed in the ocean adjacent to the diffuser and configured to measure at least one seawater parameter of seawater located in the outfall region, said sensor being further configured to transmit a sensor signal including data corresponding to the measured seawater parameter; and
    a controller configured to control an operating state of the flow control mechanism in accordance with the measured seawater parameters such that the base substance passes through the exit port into the outfall region at a maximum safe delivery rate.

2. The OAE system of claim 1, wherein the plenum chamber is suspended from the floating structure by a tether such that, when the floating structure is disposed on the ocean surface, the plenum chamber is maintained at the depth below the ocean surface by the tether.

3. The OAE system of claim 1, wherein the diffuser is maintained in the outfall region by a first securing structure that is connected between the diffuser and a fixed object.

4. The OAE system of claim 3, wherein the sensor is maintained in the outfall region by a second securing structure that is connected between the sensor and one of the diffuser and the fixed object.

5. The OAE system of claim 1,
wherein the flow control mechanism comprises a release valve, and
wherein the electrochemical reactor is configured to supply the ocean alkalinity product to the release valve with sufficient pressure such that, when the release valve is in an open operating state, the ocean alkalinity product is delivered through the release valve into the plenum chamber, and a portion of the ocean alkalinity product is forced out of the plenum chamber through the at least one exit port toward the ocean surface.

6. The OAE system of claim 1, wherein the at least one sensor is configured to measure one or more seawater parameters including: an ionic composition, turbidity, pH, alkalinity, DIC, temperature, salinity, current speed and direction of the seawater located adjacent to the outfall location.

7. The OAE system of claim 1, wherein the controller is configured to implement a control algorithm that utilizes one of a proportional integral derivative, machine learning and artificial intelligence to determine whether the seawater parameter data provided in the sensor signal exceeds a predetermined threshold value, and to generate a control signal that causes the flow control mechanism to reduce the flow of the ocean alkalinity product when the seawater parameter data indicates that the predetermined threshold value has been exceeded.

8. The OAE system of claim 1, wherein the plenum chamber comprises a plurality of exit ports and is suspended from two or more floating structures such that the plurality of exit ports are maintained at a predetermined depth below the ocean surface.

9. The OAE system of claim 8, wherein the plenum chamber is connected to two or more anchor points such that the plenum chamber is movably maintained within a designated ocean region.

10. The OAE system of claim 1,
wherein the plenum chamber comprises one or more elongated members operably communicating with a downstream end of an entry port,
wherein the flow control mechanism is operably coupled to supply the ocean alkalinity product to an upstream end of the entry port,
wherein the release apparatus further comprises a mixing valve operably coupled to receive a mixing fluid and operably coupled to supply the mixing fluid to the upstream end of the entry port such that said mixing fluid passed through the mixing valve mixes with an amount of said ocean alkalinity product passed through the flow control mechanism before passing through the entry port, and
wherein the controller is further configured to control the flow control mechanism and the mixing valve in response to said sensor data obtained from the sensor of the release apparatus such that a flow rate of the base substance passing through the at least one exit port is determined by the amounts of ocean alkalinity product and mixing fluid respectively passed through the flow control mechanism and the mixing valve.

11. An Ocean Alkalinity Enhancement (OAE) system including an electrochemical reactor configured to be land-based and to generate an ocean alkalinity product including a base substance that is fully dissolved in an aqueous solution, the OAE system comprising:
a release apparatus that is configured to be ocean-based including:
a diffuser configured to be disposed at an outfall location in an ocean and including a plenum chamber defining a plurality of exit ports,
a flow control mechanism configured to control a delivery rate of the ocean alkalinity product from the plenum chamber through the plurality of exit ports such that the base substance diffuses into seawater located in an outfall region surrounding the diffuser,
a sensor configured to be disposed in the ocean adjacent to the diffuser and configured to measure at least one seawater parameter of seawater located in the outfall region, said sensor being further configured to transmit a sensor signal including data corresponding to the measured seawater parameter; and
a controller configured to control an operating state of the flow control mechanism in accordance with the measured seawater parameters such that the base substance passes through the plurality of exit ports into the outfall region at a maximum safe delivery rate,
wherein the plenum chamber comprises at least one elongated structure having a peripheral wall surrounding an interior cavity and having an entry port operably coupled to a feedline such that, when the flow control mechanism is in an open operating state, a portion of the ocean alkalinity product passes from the feedline through the entry port and into the interior cavity, and
wherein each of the plurality of exit ports comprises an opening extending through the peripheral wall such that the ocean alkalinity product disposed in the interior cavity passes through the opening of each of the plurality of exit ports into the outfall region.

12. The OAE system of claim 11, wherein each exit port further comprises a nozzle operably coupled to the peripheral wall over an associated opening and configured such that a flow rate of the ocean alkalinity product passing from the interior cavity through the associated opening is controlled by said each nozzle.

13. The OAE system of claim 11, wherein the peripheral wall of the plenum chamber is configured such that a cross-sectional dimension of the interior cavity changes in relation to a distance from the entry port.

14. The OAE system of claim 11, wherein the elongated structure comprises at least one cylindrical peripheral wall and wherein the plurality of exit ports are arranged in a linear spaced-apart configuration along the cylindrical peripheral wall.

15. The OAE system of claim 14, wherein the plenum chamber further comprises a branching structure operably coupled to receive the ocean alkalinity product from the feedline and a plurality of elongated structures that extend in parallel from the branching structure and are operably coupled to receive portions of the ocean alkalinity product from the branching structure.

16. The OAE system of claim 15, wherein the diffuser is configured to orient the plenum chamber in the outfall region such that the plurality of elongated structures are maintained in a vertical plane.

17. The OAE system of claim 15, wherein the diffuser is configured to orient the plenum chamber in the outfall region such that the plurality of elongated structures are maintained in a horizontal plane.

18. The OAE system of claim 14, wherein the plenum chamber comprises a plurality of elongated members arranged in both horizontal and vertical planes and operably communicating with the entry port by way of one or more branching structures, and wherein each of the plurality of elongated members includes an associated group of said exit ports that are collectively disposed in the horizontal and vertical planes.

19. A release apparatus for delivering an ocean alkalinity product from an alkalinity source into an ocean, the ocean alkalinity product including a base substance that is fully dissolved in an aqueous solution, the release apparatus comprising:
- a diffuser disposed at an outfall location in the ocean and including a plenum chamber defining at least one exit port and a floating structure operably connected to the plenum chamber such that the plenum chamber is maintained at a depth below an ocean surface of the ocean with the at least one exit port aimed toward the ocean surface;
- at least one conduit configured to direct the ocean alkalinity product from the alkalinity source to the plenum chamber;
- a flow control mechanism configured to control a delivery rate of the ocean alkalinity product from the plenum chamber through the at least one exit port such that the base substance diffuses into seawater located in an outfall region surrounding the diffuser,
- a sensor disposed in the ocean adjacent to the diffuser and configured to measure at least one seawater parameter of seawater located in the outfall region, said sensor being further configured to transmit a sensor signal including data corresponding to the measured seawater parameter; and
- a controller configured to control an operating state of the flow control mechanism in accordance with the measured seawater parameters such that the base substance passes through the at least one exit port into outfall region at a maximum safe delivery rate.

* * * * *